United States Patent
Baek et al.

(10) Patent No.: US 8,345,863 B2
(45) Date of Patent: Jan. 1, 2013

(54) METHOD OF COUNTERING SIDE-CHANNEL ATTACKS ON ELLIPTIC CURVE CRYPTOSYSTEM

(75) Inventors: Yoo-Jin Baek, Seongnam-si (KR); Ihor Vasyltsov, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 1188 days.

(21) Appl. No.: 12/108,410

(22) Filed: Apr. 23, 2008

(65) Prior Publication Data

US 2009/0034720 A1 Feb. 5, 2009

(30) Foreign Application Priority Data

Jul. 11, 2007 (KR) .................. 10-2007-0069831

(51) Int. Cl.
*H04L 29/06* (2006.01)
(52) U.S. Cl. ................ 380/30; 380/28; 380/42
(58) Field of Classification Search .......... 380/28, 380/30, 42
See application file for complete search history.

(56) References Cited

U.S. PATENT DOCUMENTS

| 7,031,468 B2* | 4/2006 | Hoffstein et al. ............ 380/28 |
| 2002/0041681 A1 | 4/2002 | Hoffstein et al. |
| 2002/0114452 A1* | 8/2002 | Hamilton ................ 380/42 |
| 2006/0282491 A1* | 12/2006 | Joye ................ 708/492 |
| 2008/0013716 A1* | 1/2008 | Ding ................ 380/30 |
| 2009/0136025 A1* | 5/2009 | Kargl et al. ................ 380/30 |

FOREIGN PATENT DOCUMENTS

| JP | 55-115785 | 9/1980 |
| JP | 02-094889 | 4/1990 |
| JP | 04-095487 | 3/1992 |
| JP | 08-116549 | 5/1996 |
| JP | 2004-163687 | 6/2004 |
| KR | 2006-0068177 | 6/2006 |
| KR | 2007-0001376 | 1/2007 |

OTHER PUBLICATIONS

Blomer et al. Sign Change Fault Attacks on Elliptic Curve Cryptosystems, 2006, Springer-Verlag Berlin Heidelberg.*
Brown et al., Software Implementation of the NIST Elliptic Curves Over Prime Fields, Topics in Cryptology—CT-RSA 2001, vol. 2020 of LNCS.*

(Continued)

*Primary Examiner* — Brandon Hoffman
*Assistant Examiner* — Thomas C Lauzon
(74) *Attorney, Agent, or Firm* — F. Chau & Associates, LLC

(57) ABSTRACT

A method of countering side-channel attacks on an elliptic curve cryptosystem (ECC) is provided. The method comprises extending a definition field of an elliptic curve of the ECC to an extension ring in a first field; generating a temporary ciphertext in the extension ring and countering attacks on the ECC; and generating a final ciphertext for the first field if a fault injection attack on the ECC is not detected. The countering of attacks on the ECC may comprise countering a power attack on the ECC. Checking if there is a fault injection attack on the ECC may be performed by determining if the temporary ciphertext satisfies a second elliptic curve equation. The fault detection algorithms takes place in a small subring of the extension ring, not in the original field, to minimize the computational overhead. The method can improve the stability of the ECC and reduce computational overhead of the ECC.

14 Claims, 12 Drawing Sheets

OTHER PUBLICATIONS

Coron, Resistance Against Differential Power Analysis for Elliptic Curve Cryptosystems, Published in C .K. Koc and C. Paar, Eds., Cryptographic Hardware and Embedded Systems, vol. 1717 of Lecture Notes in Computer Science, pp. 292-302, Springer-Verlag, 1999.*

Yoo-Jin Baek and Ihor Vasyltsov, How to Prevent DPA and Fault Attack in a United Way for ECC Scalar Multiplication—Ring Extension Method, E. Dawson and D.S. Wong (Eds.): ISPEC 2007, LNCS 4464, pp. 225-237, 2007.

English Abstract for Publication No. 55-115785.
English Abstract for Publication No. 02-094889.
English Abstract for Publication No. 04-095487.
English Abstract for Publication No. 08-116549.
Japanese Office Action Dated Sep. 11, 2012.

* cited by examiner

METHOD OF COUNTERING SIDE-CHANNEL ATTACKS ON ELLIPTIC CURVE CRYPTOSYSTEM

CROSS-REFERENCE TO RELATED PATENT APPLICATION

This application claims priority, under 35 USC §119, of Korean Patent Application No. 10-2007-0069831, filed on Jul. 11, 2007, in the Korean Intellectual Property Office, the entire content of which is incorporated by reference herein.

BACKGROUND OF THE INVENTION

1. Field of the Invention

The present invention relates to a cryptographic system and, more particularly, to a method of countering side-channel attacks on an elliptic curve cryptosystem (ECC), which extends a definition field of an elliptic curve of the ECC to an extension in a finite field so as to counter power attacks and fault injection attacks on the ECC using a single algorithm.

2. Description of the Related Art

The protection of private information using cryptographic algorithms and cryptographic protocols is becoming increasingly desirable and important in our information based society. The elliptic curve cryptosystem (ECC) is increasingly being used in practice due to its shorter key sizes and efficient realizations. However, ECC is also known to be vulnerable to various side channel attacks, including power attacks and fault injection attacks. A "public key" algorithm represented by an elliptic curve cryptosystem (ECC) solves the key distribution problem and the electronic signature problem of secret key cryptographic algorithms and has been widely applied to many fields including personal computer data security, Internet based data and financial networks.

The ECC is widely used for smart cards and electronic signatures because the ECC can secure high stability even with a relatively small key size. The ECC is an encoding/decoding system based on a special addition function based on a mathematical and geometrical object called an elliptic curve. In the ECC, an arbitrary elliptic curve E and a point P on the elliptic curve E are selected as system parameters. A person X who wants to encrypt a communication randomly generates an integer d and multiplies the integer d by the point P to generate public key Q (=d*P). Person X publishes Q as a public key and safely stores d as his secret key. Person Y who wants to secretly transmit a message M to person X randomly generates an integer k and multiplies the integer k by the point P to generate A (=k*P). Then, person Y generates B (=M+k*Q) using the public key Q and the message M and transmits a final ciphertext (A,B) to person X. Person X who receives the ciphertext (A,B) calculates d*A using the secret key d, and then performs an arithmetic operation represented by the following Equation 1 so as to restore the message M:

$$M = B - d*A \qquad \text{[Equation 1]}$$

Accordingly, the most important arithmetic operation in ECC is the multiplication d*P. Here, the multiplication d*P can be achieved according to addition and doubling operations on an elliptic curve.

The elliptic curve that is a basis of the operation of ECC will now be explained.

For involution of a prime, q, Fq represents a finite field F having elements q. An elliptic curve E over Fq includes a point at infinity O and is a set of points satisfying the nonsingular Weierstrass equation of Equation 2:

$$y^2 + a_1*x*y + a_3*y = x^3 + a_2*x^2 + a_4*x + a_6,\ a_i \in Fq \qquad \text{[Equation 2]}$$

In mathematics, more specifically in abstract algebra, field extensions are the main object of study in field theory. The general idea is to start with a base field and construct in some manner a larger field which contains the base field and satisfies additional properties. Field extensions can be generalized to ring extension which consists of a ring and one of its subrings. A field extension is a special case of ring extension. In mathematics, more specifically in ring theory, a ring extension or extension ring is a ring R with a subring S. We write R/S and say R is a ring extension of S. For a random extension field K of Fq (see Equation 2), E(K) is defined as a subset of E which includes rational elliptic curve points, as represented by the following Equation 3 wherein E(K) is represented as E for convenience of explanation:

$$E(K) = \{(x,y) \in E | x,y \in K\} \cup \{Q\} \qquad \text{[Equation 3]}$$

As well known in the art, E(K) forms an Abelian group for a specific addition formula. In mathematics, an Abelian group, also called a commutative group, is a group (G, *) with the additional property that the group operation * is commutative, so that for all a and b in G, a*b=b*a. Abelian groups are named after Norwegian mathematician Niels Henrik Abel. Groups in which the group operation is not commutative are called non-Abelian (or non-commutative). Group operation in an Abelian group is commutative as well as associative. For example, it is known that Equation 2 can be transformed to the following Equation 4 using an appropriate elliptic curve isomorphism if q is involution of 2 and the elliptic curve E is not a supersingular elliptic curve.

$$y^2 + x*y = x^3 + a*x^2 + b,\ a,b \in Fq \qquad \text{[Equation 4]}$$

It is assumed that the point at infinity O functions as an identity element and two points P and Q that satisfy Equation 4 satisfy Equation 5:

$$P = (x1,y1) \in E(K) - \{O\}$$

$$Q = (x2,y2) \in E(K) - \{O,-P\} \qquad \text{[Equation 5]}$$

Under the condition of Equation 5, the inverse element −P of the point P is defined as −P=(x1, x1+y1) for the two points P and Q satisfying Equation 4 and P+Q (=x3, y3) is represented by Equations 6 and 7. Here, Equation 6 below defines an addition formula when P and Q are different from each other and Equation 7 below defines an addition formula when P and Q are equal to each other.

$$x3 = ((y1+y2)/(x1+x2))^2 + (y1+y2)/(x1+x2) + x1 + x2 + a$$

$$y3 = ((y1+y2)/(x1+x2))*(x1+x3) + x3 + y1 \qquad \text{[Equation 6]}$$

$$x3 = x1^2 b/x1^2$$

$$y3 = x1^2 + (x1+y1/x1)*x3 + x3 \qquad \text{[Equation 7]}$$

Addition formulas for other elliptic curves can be found in Reference [17]. In the operation of ECC, one of the arithmetic operations that requires a long period of time is scalar multiplication. If k is a positive integer and P is a point on an elliptic curve E, scalar multiplication k*P means the addition of P k times and (−k)*P means addition of −P k times. ECC is explained in more detail in References [13] and [19].

Although ECC has the aforementioned advantages, it is well known that ECC is vulnerable to various side-channel attacks including power attacks and fault injection attacks. In cryptography, a "side channel attack" is any attack based on information gained from the physical implementation of a cryptosystem, rather than theoretical weaknesses in the algorithms (compare cryptanalysis). For example, timing information, power consumption, electromagnetic leaks or even sound can provide an extra source of information that can be exploited to break the cryptosystem and decode the encrypted information. Many side-channel attacks require considerable technical knowledge of the internal operation of the system on which the cryptography is implemented. The power monitoring attacks and fault injection attacks are generally explained below.

The power monitoring side-channel attacks were firstly described by Kocher et al. (Refer Reference [14]). The power monitoring attacks extract secret information from power (e.g., electrical current) consumption and/or heat generation of a microprocessor while being used to implement cryptosystem. Power consumption attacks on ECC, which are known to include a simple power attack (SPA), a differential power attack (DPA), a refined power-analysis attack (RPA), a zero-value point attack (ZPA) and a doubling attack.

The SPA observes power consumption signals with respect to a single execution of cryptography and classifies various fundamental crypto operations (For example, addition and doubling operations in ECC) from the power consumption signals. Examining graphs of time against current used by a device can often show exactly what the device is doing at a given point. Accordingly, Double-and-Add Always method and Montgomery powering ladder algorithm are used as countermeasures against the SPA. The Double-and-Add Always method is explained in detail in Reference [7] and the Montgomery powering ladder algorithm is explained in detail in References [12], [15] and [20].

The DPA collects power consumption data and obtains useful information from the power consumption data using a statistical tool. Random blinding techniques are used as countermeasures for the DPA. The random blinding techniques include a random exponent blinding method, a random message blinding method and random point representation. However, the random blinding techniques are vulnerable to power attacks such as RPA and ZPA. The random blinding techniques are described in detail in Reference [7].

Furthermore, a random elliptic curve isomorphism method, a random field isomorphism method, a 2P* method and a multiplier randomization method are also used as countermeasures for the DPA. However, the random elliptic curve isomorphism method, random field isomorphism method, and 2P* method are vulnerable to RPA and ZPA and the multiplier randomization method has low memory efficiency. The random elliptic curve isomorphism method and random field isomorphism method are explained in detail in Reference [11] and the 2P* method and multiplier randomization method are described in detail in Reference [6].

The RPA uses the feature that processing for points having a zero coordinate and processing for other (non-zero) points have different power consumption profiles. The RPA selects a specific point having the zero coordinate, and then inputs a point that is equal to the specific point when multiplied by a specific scalar to a device (system) so as to perform a power attack. Though the ZPA is similar to the RPA, the ZPA does not use zero coordinates and uses a zero-value register.

Both the RPA and ZPA operate only when intermediate results of scalar multiplication algorithms can be supposed partially or entirely. Accordingly, the RPA and ZPA can be prevented if appropriate message and/or exponent randomization techniques are applied to scalar multiplication algorithms. The RPA and ZPA are respectively described in detail in References [9] and [1].

The doubling attack attacks a cryptosystem based on the assumption that an adversary can find whether two intermediate result values of two different arithmetic operations are identical to each other. Accordingly, the doubling attack can be prevented if appropriate message and/or exponent randomization techniques are used. The doubling attack is described in detail in Reference [8].

The fault injection attack (refer to References [2], [4] and [5]) is a very powerful cryptosystem attack technique. The fault injection attack injects an intentional fault into a cryptosystem and analyzes a fault result to obtain significant information. Accordingly, a general countermeasure for the fault injection attack is to check validity of input values or output values. Specifically, whether a fault is injected into ECC is checked by determining whether input points and output points of an elliptic curve scalar multiplication algorithm satisfy an elliptic curve equation in the ECC.

Another powerful countermeasure to the fault injection attack, proposed by Shamir and applied to an RSA cryptosystem, is herein generally explained. Person A who wants to perform cryptography communication generates two large primes p and q and calculates N ($=p \times q$) and $\phi(n)$ $\{=(p-1) \times (q-1)\}$ using the two primes p and q. Then, person A selects an integer e which is relatively prime for $\phi(n)$ and generates an integer d that satisfies Equation 8. Here, relatively prime means the relationship between two natural numbers having only one common factor, "1". For example, 8 and 9 are relatively prime because factors of 8 are 1, 2, 4 and 8 and factors of 9 are 1, 3 and 9.

$$ed = 1 \bmod \phi(n) \qquad \text{[Equation 8]}$$

Equation 8 is a modular equation that represents that the remainder of a division of ed by $\phi(n)$ is 1. In mathematics, a modular equation is an algebraic equation satisfied by moduli, in the sense of moduli problem. That is, given a number of functions on a moduli space, a modular equation is an equation holding between them, or in other words an identity for moduli. The most frequent use of the term modular equation is in relation with the moduli problems for elliptic curves. In the case of elliptic curves, there is one modulus, so moduli spaces are algebraic curves. The modulus of the elliptic integral therefore was probably the first modulus to be recognized. Thus, the equation of a modular (elliptic) curve is a modular equation.

An elliptic curve can be represented by several sets of coordinates. The addition formula, which is defined by setting a point at infinity O to zero, differs for each coordinate: the computation amount of addition differs for each coordinate. Two coordinates, affine coordinates and projective coordinates, are well known. Affine coordinate requires a division in every addition and every doubling but requires fewer multiplications than projective coordinate.

Another coordinate is called jacobian coordinate. The addition formula in jacobian coordinates does not require any division modulo p in either addition or doubling and requires a division only once in the final stage of the computation of elliptic curve exponentiation.

Referring to the above modular Equation 8, person A publishes N and e as his public key and safely stores p, q and d as his secret keys. Person B who wants to transmit an encrypted message m transmits a ciphertext C corresponding to a result of a modular exponentiation operation represented by the following Equation 9 using the public key (N, 3) of person A.

$$C = m^e \bmod N \qquad \text{[Equation 9]}$$

Person A who receives the ciphertext C from person B performs a modular exponentiation represented by the following Equation 10 using his secret key d to restore the original message m (plaintext).

$$M = C^d \bmod N \qquad \text{[Equation 10]}$$

Accordingly, the most important operation in an RSA public key cryptosystem is the modular exponentiation that calculates $m^e \bmod N$ or $C^d \bmod N$. Here, to safely insulate the calculation of Equation 9 or Equation 10 from the fault injection attack, the Shamir method selects a sufficiently small arbitrary prime r and calculates $m^{p'}$ and $m^{q'}$.

$$m^{p'} = m^{d \bmod (p-1)*(r-1)} \bmod p*r$$

$$m^{q'} = m^{d \bmod (q-1)*(r-1)} \bmod q*r \quad \text{[Equation 11]}$$

Subsequently, the Shamir method checks whether $m^{p'} \equiv m^{q'} \bmod r$. Then, the plaintext m represented by Equation 10 can be easily obtained using Chinese remainder theorem (CRT). Reference [18] explains the RSA cryptosystem in detail.

A sign change fault attack has been recently proposed as a new fault injection attack. The sign change fault attack changes only the sign (positive/negative) of the coordinate of an intermediate result value of a scalar multiplication of an ECC so as to avoid the point validity judgment that serves as a countermeasure against general fault injection attacks. To counter the sign change fault attack, a method of performing two ECC scalar multiplications was proposed. However, this method deteriorates system performance. The sign change fault attack is described in detail in Reference [4].

As described above, the methods for countering the power attacks and fault injection attacks on an ECC have problems in terms of security and performance, cannot cope with simultaneous power attacks and the fault injection attacks, or cause system performance deterioration when countering the sign change fault attack.

SUMMARY OF THE INVENTION

Exemplary embodiments of the present invention provide methods of countering side-channel attacks against an elliptic curve cryptosystem (ECC), for improving the security of the ECC. The basic idea of proposed countermeasures lies in extending the definition field of an elliptic curve to its random extension ring and performing the required elliptic curve operations over the ring. Various exemplary embodiments provide new methods that perform a point validation check in a small subring of the extension ring to give an efficient fault attack countermeasure.

Various embodiments of the present invention also provide a methods of countering simultaneous power attacks and fault injection attacks against an ECC.

Various embodiments of the present invention also provide methods of countering side-channel attacks against an ECC, which are able to avoid deteriorating system performance while countering a sign change fault attack against the ECC.

According to an aspect of the present invention, there is provided a method of countering side-channel attacks on an ECC, the method comprising: extending a definition field of an elliptic curve of the ECC to an extension ring in a first field; generating a temporary ciphertext in the extension ring and countering side-channel attacks on the ECC; and generating a final ciphertext for the first field if a fault injection attack on the ECC is not detected.

The countering of side-channel attacks on the ECC may comprise countering a power attack on the ECC and checking a fault injection attack on the ECC.

The temporary ciphertext may be a scalar multiplication of a point P satisfying an elliptic curve equation of the ECC and a secret key d. The generating of the temporary ciphertext may comprise receiving the point P and setting the secret key d, representing the secret key d as a bit stream, performing the scalar multiplication on the point P and the secret key d. The number of bits of the secret key d may correspond to $\log_2 d$.

The power attack may be a differential power attack. The countering of the power attack may comprise performing addition and doubling operations on the bits of the secret key d if the point P satisfying the elliptic curve equation of the ECC is given.

The checking of the fault injection attack on the ECC may comprise checking if the temporary ciphertext satisfies a second elliptic curve equation. The second elliptic curve equation may include a term for checking if there is a sign change fault attack on the ECC.

The first field may be a prime finite field. The extending of the definition field of the elliptic curve to the extension ring may comprise setting a prime p and a random integer r, defining a first elliptic curve equation in the prime finite field for the prime p, and converting the first elliptic curve equation to a second elliptic curve equation in the extension ring for the prime p and the integer r.

The first elliptic curve equation may become $Y^2*Z = X^3 + a*X*Z^4 + b*Z^6$ when represented in Jacobian coordinate and become $y^2 = x^3 + a*x + b$ when represented in Affine coordinate.

The converting of the first elliptic curve equation to the second elliptic curve equation comprises converting b to B $(=s^2 + p*s - t^3 - a*t \bmod p*r)$ so as to obtain the second elliptic curve equation, $Y^2*Z = X^3 + a*X*Z^4 + B*Z^6$. Here, (t, s) represents the coordinates of an input point P of the ECC.

The second elliptic curve equation may include a term for checking if there is a sign change fault attack on the ECC. The first elliptic curve equation may become $Y^2*Z + p*y Z^3 = X^3 + a*X*Z^4 + b*Z^6$ when represented in Jacobian coordinate and become $y^2 + p*y = x^3 + a*x + b$ when represented in Affine coordinate.

The converting of the first elliptic curve equation to the second elliptic curve equation may comprise converting b to B $(=s^2 + p*s - t^3 - a*t \bmod p*r)$ so as to obtain the second elliptic curve equation, $Y^2*Z + p*y*Z^3 = X^3 + a*X*Z^4 + B*Z^6$. Here, (t, s) represents the coordinates of the input point P of the ECC.

The countering of attacks on the ECC may comprise checking if the temporary ciphertext satisfies a third elliptic curve equation corresponding to the result of a modular operation of the second elliptic curve equation for the integer r for a fault injection attack on the ECC.

Coordinates of the sum P3 $(=(X3; Y3; Z3))$ of two points P1 $(=(X1; Y1; Z1))$ and P2 $(=(X2; Y2; Z2))$ satisfying the second elliptic curve equation may be obtained according to the following addition operations if $P1 \neq \pm P2$ if P1 and P2 are not points at infinity.

$$Z3 = Z1*Z2*(X2*Z1^2 - X1*Z2^2)$$

$$X3 = (Y2*Z1^3 - Y1*Z2^3)^2 - (X2*Z1^2 X1*Z2^2)^2*(X2*Z1^2 + X1*Z2^2)$$

$$Y3 = (Y2*Z1^3 - Y1*Z2^3)*(X1*Z2^2*(X2*Z1^2 - X1*Z2^2)^2 - X3) - (Y1 + p*Z1^3)*(Z2^3*(X2*Z1^2 - X1*Z2^2)^3)$$

Coordinates of the sum P3 $(=P1 + P2 = 2*P1 = 2*P2 = ((X3; Y3; Z3))$ of two points P1 $(=(X1; Y1; Z1))$ and P2 $(=X2; Y2; Z2)$ satisfying the second elliptic curve equation may be obtained according to the following doubling operations if P1=P2 if P1 and P2 are not points at infinity.

$$Z3 = Z1*(2*Y1 + p*Z1^3)$$

$$X3 = (3*X1^2 + a*Z1^4)^2 - 2*X1*(2*Y1 + p*Z1^3)^2$$

$$Y3 = (3*X1^2 + a*Z1^4)*(X1*(2*Y1 + p*Z1^3)^2 - X3) - (Y1 + p*Z1^3)*(2*Y1 + p*Z1^3)^3$$

The generating of the final ciphertext for the first field may comprise generating the first ciphertext corresponding to the result of a modular operation on coordinates of the temporary ciphertext on the extension ring for the prime p.

The first field may be a binary finite field. The extending of the definition field of the elliptic curve to the extension ring may comprise setting an m-order irreducible binary polynomial f(z) and a random polynomial r(z), defining a first elliptic curve equation in a binary finite field $F2^m (=F_2[z]/f(z))$ for the irreducible binary polynomial f(z), and converting the first elliptic curve equation to a second elliptic curve equation on an extension ring $F_2[z]/f(z)*r(z))$ for the irreducible binary polynomial f(z) and the polynomial r(z). The polynomial r(z) may be an irreducible binary polynomial.

The first elliptic curve equation may correspond to $Y^2+X*Y*Z=X^3+a*X^2*Z^2+b*Z^6$ and the second elliptic curve equation may correspond to $Y^2*Z+X*Y*Z=X^3+a*X^2*Z^2+B*Z^6$ wherein b is converted to B ($=s^2+t*s+t^3+a*t^2$ mod $f(z)*r(z)$). Here, (t, s) represents the coordinates of the input point P of the ECC.

The countering of attacks on the ECC may comprise checking if the temporary ciphertext satisfies a third elliptic curve equation corresponding to the result of a modular operation of the second elliptic curve equation for the polynomial r(z) for a fault injection attack on the ECC.

Coordinates of the sum P3 (=(X3; Y3; Z3)) of two points P1 (=(X1; Y1; Z1)) and P2 (=(X2; Y2; Z2)) satisfying the second elliptic curve equation may be obtained according to the following addition operations if P1≠±P2 if P1 and P2 are not points at infinity.

$$Z3=Z1*Z2*(X1*Z2^2-X2*Z1^2)$$

$$X3=a*Z3^2+(Y1*Z2^3+Y2*Z1^3)*(Y1*Z2^3+Y2*Z1^3+Z3)+(X1*Z2^2+X2*Z1^2)^3$$

$$Y3=((Y1*Z2^3+Y2*Z1^3)*X2+Z1*Y2*(X1*Z2^2+X2*Z1^2))*((X1*Z2^2+X2*Z1^2)*Z1)^2+(Y1*Z2^3+Y2*Z1^3+Z3)*X3$$

Coordinates of the sum P3 (=P1+P2=2*P1=2*P2=(X3; Y3; Z3)) of two points P1 (=(X1; Y1; Z1)) and P2 (=X2; Y2; Z2) satisfying the second elliptic curve equation may be obtained according to the following doubling operations if P1=P2 if P1 and P2 are not points at infinity, $$Z3=X1*Z1^2$$

$$X3=(X1+C*Z1^2)^4$$

$$Y3=X1^4*Z3+(Z3+X1^2+Y1*Z1)*X3$$

wherein $C=B^{1/4}$ mod $f(z)*r(z)$.

The generating of the final ciphertext for the first field may comprise performing a modular operation on coordinates of the temporary ciphertext on the extension ring for the polynomial f(z).

The present invention will be described below more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the features and concept of the invention to those skilled in the art. Throughout the drawings, like reference numerals refer to like elements.

BRIEF DESCRIPTION OF THE DRAWINGS

The above and other features of the present invention will become more apparent to persons skilled in the art by describing in detail exemplary embodiments thereof with reference to the attached drawings in which.

DETAILED DESCRIPTION OF EXEMPLARY EMBODIMENTS OF THE INVENTION

Figure 1:
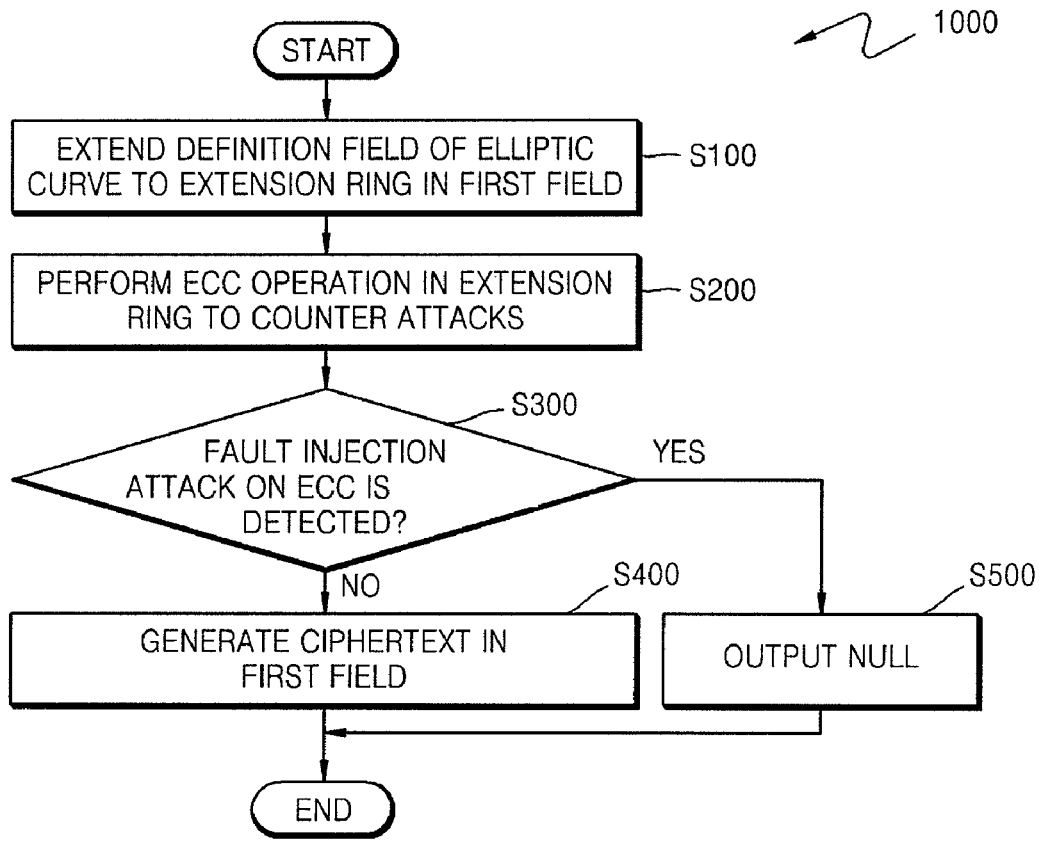
FIG. 1 is a flow chart of a method of countering side-channel attacks on an elliptic curve cryptosystem (ECC) according to an embodiment of the present invention.

FIG. 1 is a flow chart of a method 1000 of countering side-channel attacks on an ECC according to an exemplary embodiment of the present invention. Referring to FIG. 1, the method 1000 of countering side-channel attacks on an ECC according to an embodiment of the present invention includes a step S100 of extending a definition field of an elliptic curve of the ECC to an extension ring in a first field, a step S200 of generating a temporary ciphertext and countering side-channel attacks on the ECC, and a (conditional) step S400 of generating a final ciphertext for the first field if a side-channel attack on the ECC is not detected (e.g., not detected in the countering step S200).

A method of countering side-channel attacks on an ECC in a prime finite field is herein explained: An elliptic curve equation with respect to an extension ring in the prime finite field is defined first, and then a method of countering power attacks and fault injection attacks in the extension ring is next explained.

Figure 2:
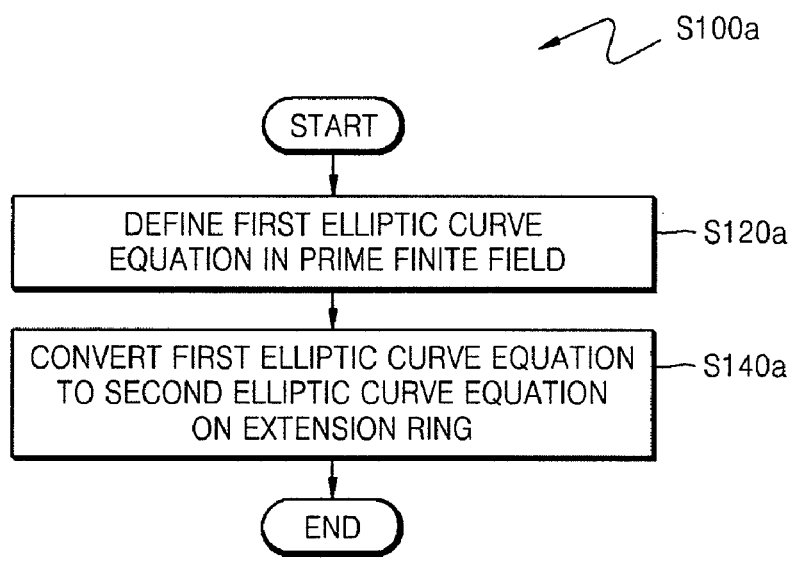
FIG. 2 is a flow chart of substeps of the step of extending a definition field of the ECC, defined in a prime finite field, illustrated in FIG. 1 according to an embodiment of the present invention.
Figure 3:
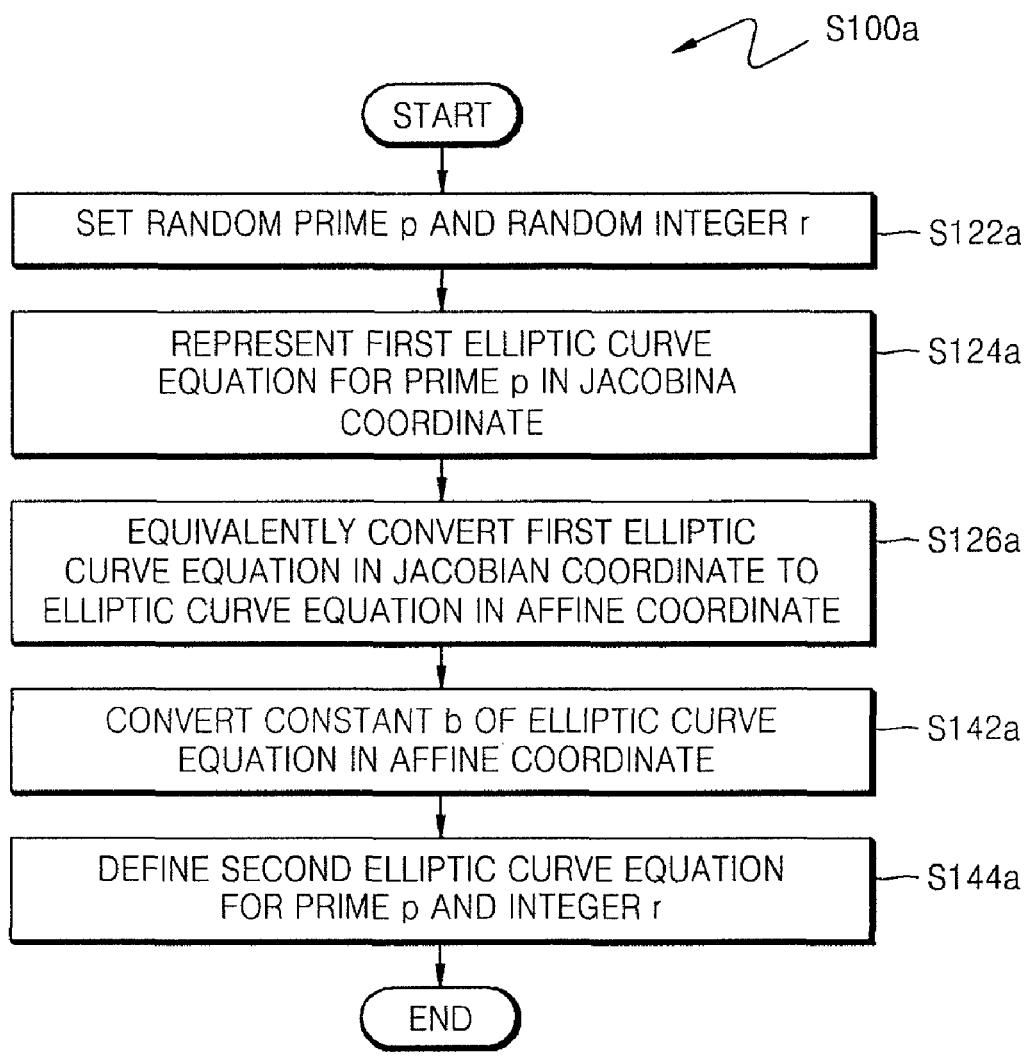
FIG. 3 is a flow chart illustrating the operation of extending the definition field region of the ECC illustrated in FIG. 2 in detail.

FIG. 2 is a flow chart illustrating substeps of the step S100a of extending the definition field of the ECC in a prime finite field, and FIG. 3 is a flow chart illustrating the substeps of step S100a of FIG. 2 in more detail.

Referring to FIG. 2, the step S100 (S100a) of extending the definition field of the elliptic curve to the extension ring in a prime finite field Fp includes a substep S120a of defining a first elliptic curve equation in the prime finite field Fp for a prime p and a substep S140a of converting the first elliptic curve equation to a second elliptic curve equation on an extension ring Zpr for the prime p and an integer r.

Referring to FIG. 3, the prime p, the integer r and a point P on the elliptic curve P (P=t, s) are set to define the second elliptic curve equation on the extension ring Zpr in a substep S122a of the step S100 of FIG. 1. The integer r is set to a small value in order to reduce computational overhead of the cryptosystem. However, the value of the integer r is selected to guarantee the stability of the cryptosystem.

When the prime p and the integer r are determined, the first elliptic curve equation for the prime p is defined in Jacobian coordinate and/or Affine coordinate in steps S124a and/or S126a. The first elliptic curve equation is represented as Equation 12 when defined in Jacobian coordinate and represented as Equation 13 when defined in Affine coordinate.

$$E: Y^2*Z + p*YZ^3 = X^3 + a*X*Z^4 + b*Z^6 \quad \text{[Equation 12]}$$

$$y2 + p*y = x^3 + a*x + b \quad \text{[Equation 13]}$$

When b is converted to B represented by Equation 14 in a substep S142a, the first elliptic curve equation can be converted to the second elliptic curve equation represented as Equation 15 in a substep S144a.

$$B = s^2 + p*s - t^3 - a*t \bmod p*r \quad \text{[Equation 14]}$$

$$E': Y^2*Z + p*y*Z^3 = X^3 + a*X*Z^4 + B*Z^6 \quad \text{[Equation 15]}$$

Figure 4:
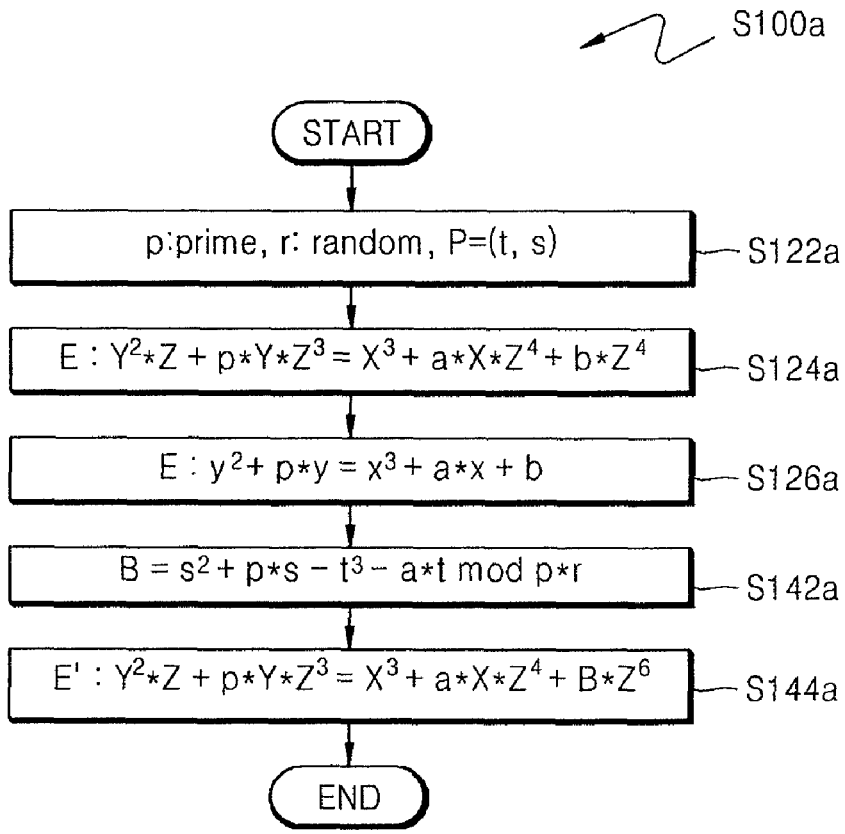
FIG. 4 is a flow chart illustrating the operation of extending the definition field of the ECC illustrated in FIG. 3 in more detail.

The aforementioned elliptic curve equation conversion operation is illustrated in FIG. 4 in more detail. Although FIGS. 3 and 4 illustrate that the first elliptic curve equation is converted to Jacobian coordinate and then converted to Affine coordinate (S124a and S126a), the invention is not limited thereto and the first elliptic curve equation in Jacobian coordinate can be directly converted to the second elliptic curve equation.

The second elliptic curve equation can include a term for checking whether there is a sign change fault attack on the ECC, as exemplified by Equation 15. The second elliptic curve equation represented as Equation 15 includes a term $p*Y*Z^3$ for checking for (detecting) a sign change fault attack on the ECC.

If the second elliptic curve equation represented as Equation 15 does not include the term $p*Y*Z^3$, then Equations 12, 13, 14 and 15 can be respectively defined as the following Equations 16, 17, 18 and 19:

$$Y^2*Z = X^3 + a*X*Z^4 + b*Z^6 \quad \text{[Equation 16]}$$

$$y^2 = x^3 + a*x + b \quad \text{[Equation 17]}$$

$$B = y^2 - x^3 - a*t \bmod p*r \quad \text{[Equation 18]}$$

$$Y^2*Z = X^3 + a*X*Z^4 + B*Z^6 \quad \text{[Equation 19]}$$

The term with respect to Y in Equations 12, 13 and 15 does not affect the operation of the ECC because the coefficient of the term with respect to Y is the prime p and thus the value is zero in the first field all the time. Accordingly, Equations 12, 13, 14 and 15 produce the same results as the results of Equations 16, 17, 18 and 19 for the first field.

It is checked whether the ciphertext (point P) satisfies the elliptic curve equation in order to counter (detect) fault injection attacks. However, when the sign of Y coordinate of the ciphertext P is changed, the elliptic curve equation such as Equation 19 is not changed for the changed ciphertext, and thus it is difficult to check whether a fault injection attack is made against the cryptosystem. In the case of the elliptic curve equation such as Equation 15, however, a sign change fault that changes only the sign of Y coordinate of an arbitrary point varies the result of the equation, and thus it can be detected whether a sign change fault attack is made against the ECC.

Figure 8:
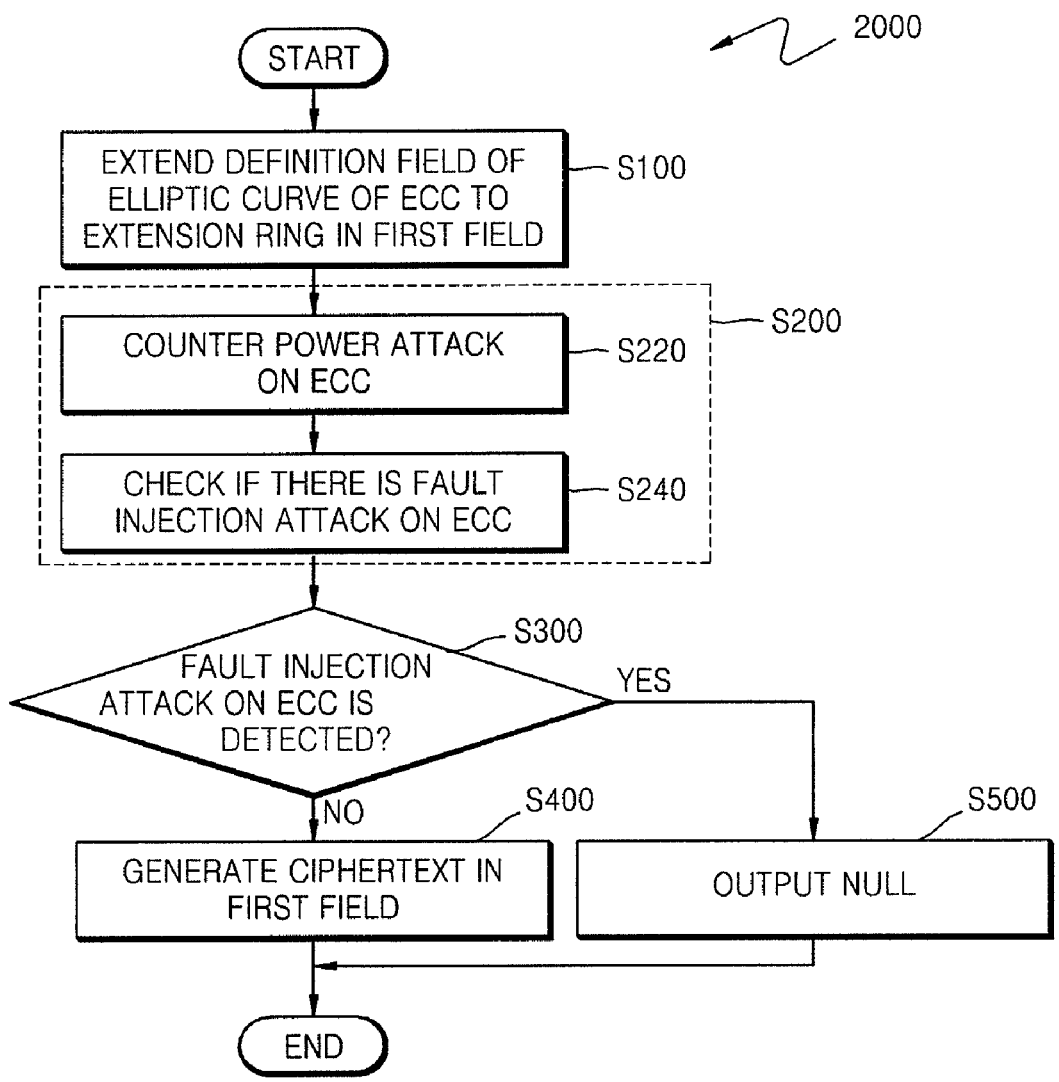
FIG. 8 is a flow chart of a method of countering side-channel attacks on an ECC according to another embodiment of the present invention.

Referring back to FIG. 1, the method 1000 of countering side-channel attacks on an ECC according to an exemplary embodiment of the present invention counters side-channel attacks on the ECC when the extension ring is defined in step S200. Referring to FIG. 8, in the method 2000 of countering side-channel attacks on an ECC according to another exemplary embodiment of the present invention the step S200 can include a substep S220 of countering a power attack and a substep S240 of checking a fault injection attack on the ECC.

Figure 9:
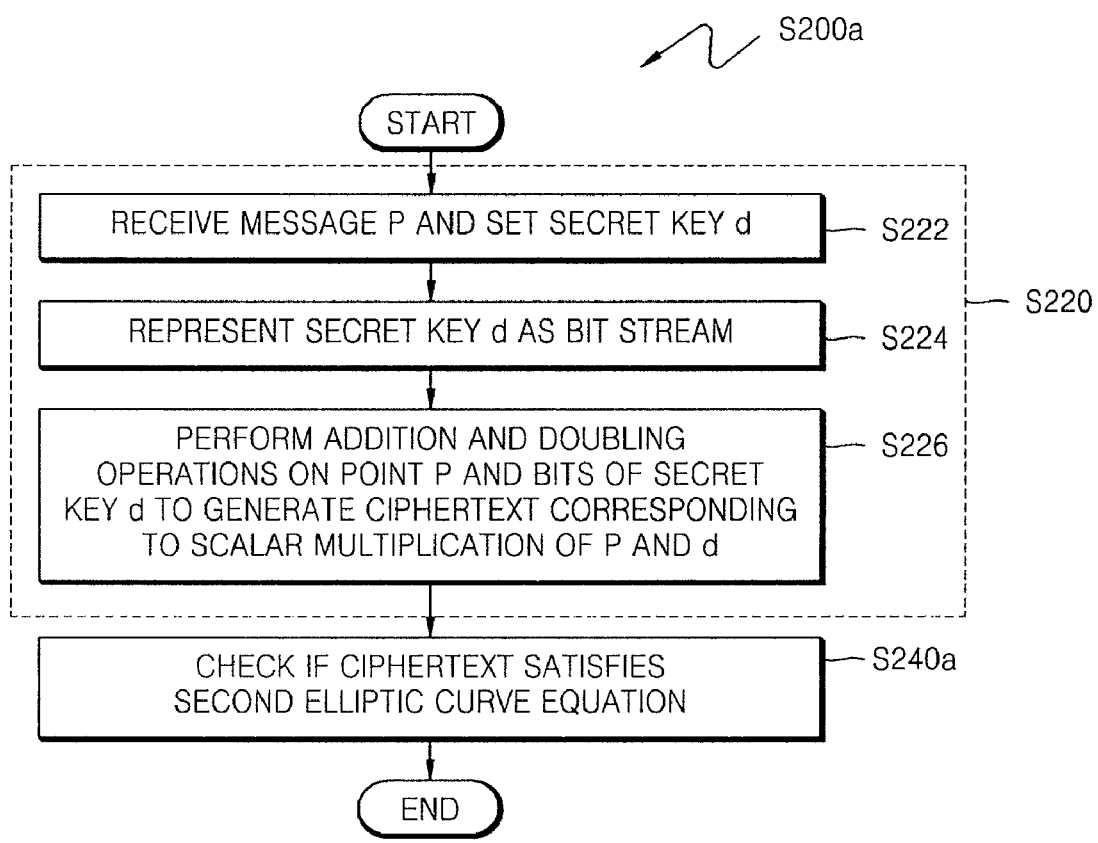
FIG. 9 is a flow chart illustrating substeps of the method of countering side-channel attacks on the ECC illustrated in FIG. 8 according to an embodiment of the present invention.
Figure 11:
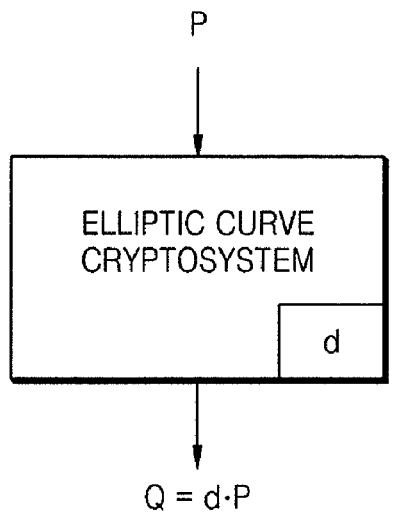
FIG. 11 illustrates the concept of the ciphertext generating steps illustrated in FIGS. 9 and 10.

FIG. 9 is a flow chart of substeps of the step S200a of countering side-channel attacks on an ECC illustrated in FIG. 8 according to an exemplary embodiment of the present invention. Referring to FIGS. 8 and 9, the step S200s includes a substep S222 of setting the point P satisfying the elliptic curve equation and a secret key d, a substep S224 of representing the secret key d as a bit stream, and a substep S226 of performing addition and doubling operations on the point P and bits of the secret key d to generate a temporary ciphertext corresponding to a scalar multiplication of the point P and the secret key d. The number of bits of the secret key d can correspond to $\log_2 d$. The general concept of the generating the temporary ciphertext is illustrated in FIG. 11.

The method of countering side-channel attacks on an ECC according to the current embodiment of the present invention counters power attacks on an extension ring, and thus addition and doubling operations for the extension ring (the second elliptic curve equation represented as Equation 15 and/or Equation 19) are required. Equations 20 and 21 respectively represent addition and doubling operations for the second elliptic curve equation in the prime finite field.

When two points satisfying the second elliptic curve equation are P1 (=(X1; Y1; Z1)) and P2 (=(X2; Y2; Z2)) and if P1 and P2 are not points at infinity, then coordinates of the sum of P1 and P2, P3 (=P1+P2=(X3; Y3; Z3)), are obtained according to Equation 20, if P1 does not equal P2 nor the inverse element of P2 (P1≠±P2). If P1 equals P2 (P1=P2), the coordinates of P3 (=P1+P2=2*P1=2*P2=(X3; Y3; Z3)) are obtained according to Equation 21.

$$Z3 = Z1*Z2*(X2*Z1^2 - X1*Z2^2)$$

$$X3 = (Y2*Z1^3 - Y1*Z2^3)^2 - (X2*Z1^2 - X1*Z2^2)^2 * (X2*Z1^2 + X1*Z2^2)$$

$$Y3 = (Y2*Z1^3 - Y1*Z2^3)*(X1*Z2^2*(X2*Z1^2 - X1*Z2^2)^2 X3) - (Y1 + p*Z1^3)*(Z2^3*(X2*Z1^2 - X1*Z2^2)^3) \quad \text{[Equation 20]}$$

$$Z3=Z1*(2*Y1+p*Z1^3)$$

$$X3=(3*X1^2+a*Z1^4)^2-2*X1*(2*Y1^2+p*Z1^3)^2$$

$$Y3=(3*X1^2+a*Z1^4)*(X1*(2*Y1^2+p*Z1^3)^2-X3)-(Y1+p*Z1^3)*(2*Y1+p*Z1^3)^3 \quad \text{[Equation 21]}$$

Figure 12A:
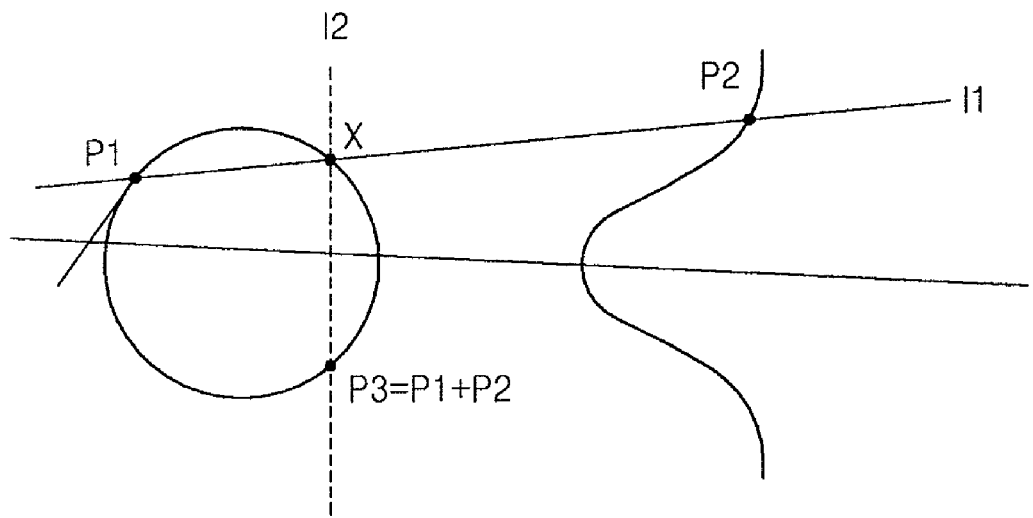
FIG. 12A is a geometrical graphic representation of the addition operations of substep S226 in FIGS. 9 and 10.
Figure 12B:
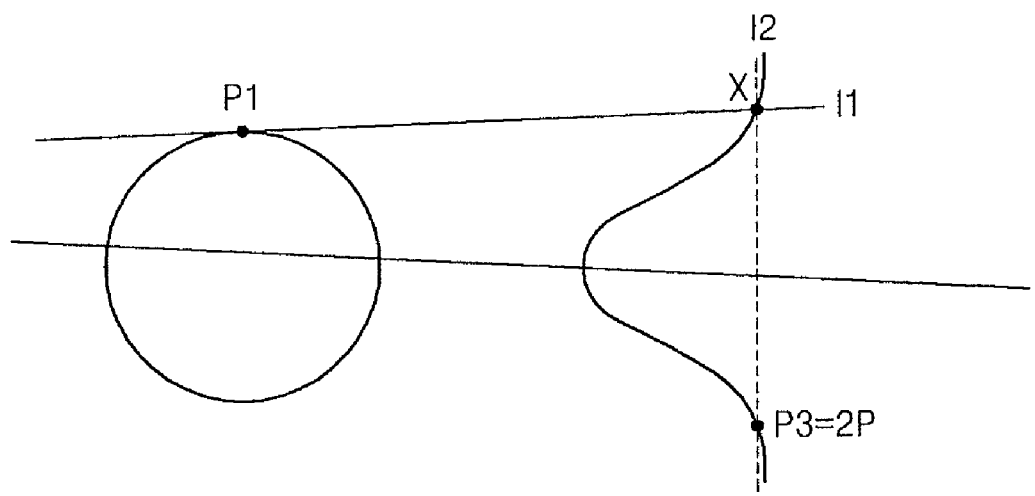
FIG. 12B is a geometrical graphic representation of the doubling operations of substep S226 in FIGS. 9, 10 and 11.

FIG. 12A is a geometrical graphic illustrating the concept of the addition operations of Equation 20 and FIG. 12B is a geometrical graphic illustrating the concept of the doubling operation of Equation 21. Referring to FIG. 12A, the point P3 at which a straight line I2, that meets the elliptic curve and is parallel with y axis, corresponds to the sum of the two points P1 and P2. The straight line I2 passes through a point X at which a straight line I1 (a tangent line) connecting the two points P1 and P2 on an elliptic curve meets the elliptic curve. Referring to FIG. 12B, the point P3 at which the straight line I2, that meets the elliptic curve and is parallel with the y axis, meets the elliptic curve doubles the point P1. The straight line I2 passes through the point X at which the tangent line I1 for the point P1 on the elliptic curve meets the elliptic curve.

Referring back to FIG. 9, the substep S226 can be implemented as (pseudocode) Algorithm 1:

---

[Algorithm 1]

---

Input:
  E : $Y^2*Z + p*Y*Z^3 = X^3 + a*X*Z^4 + B*Z^6$, an elliptic curve over Zpr
  P ∈ E(Zpr)
  d = $\Sigma^{n-1} d_i 2^i$ : secret scalar
Output: Q = d*P ∈ E(Zpr)
1. Q[0] ← P
2. For i = n−2 to 0 by −1, do
    2.1 Q[0] ← DLB - JP(Q[0])
    2.2 Q[1] ← ADD - JP(Q[0], P)
    2.3 Q[0] ← Q[$d_i$]
3. Return Q[0]

---

Algorithm 1 cannot analyze the power consumption signal varying with arithmetic operation because Algorithm 1 performs addition and doubling operations on bits for a simple power attack. In Algorithm 1, the function DLB-JP( ) represents the doubling operation of Equation 21 and the function ADD-JP( ) represents the addition operation of Equation 20. Algorithm 1 stores addition and doubling operations performed on bits in registers Q[0] and Q[1] on the extension ring Zpr and selects a required register according to $d_i$ so as to counter the aforementioned power attack.

Figure 13:
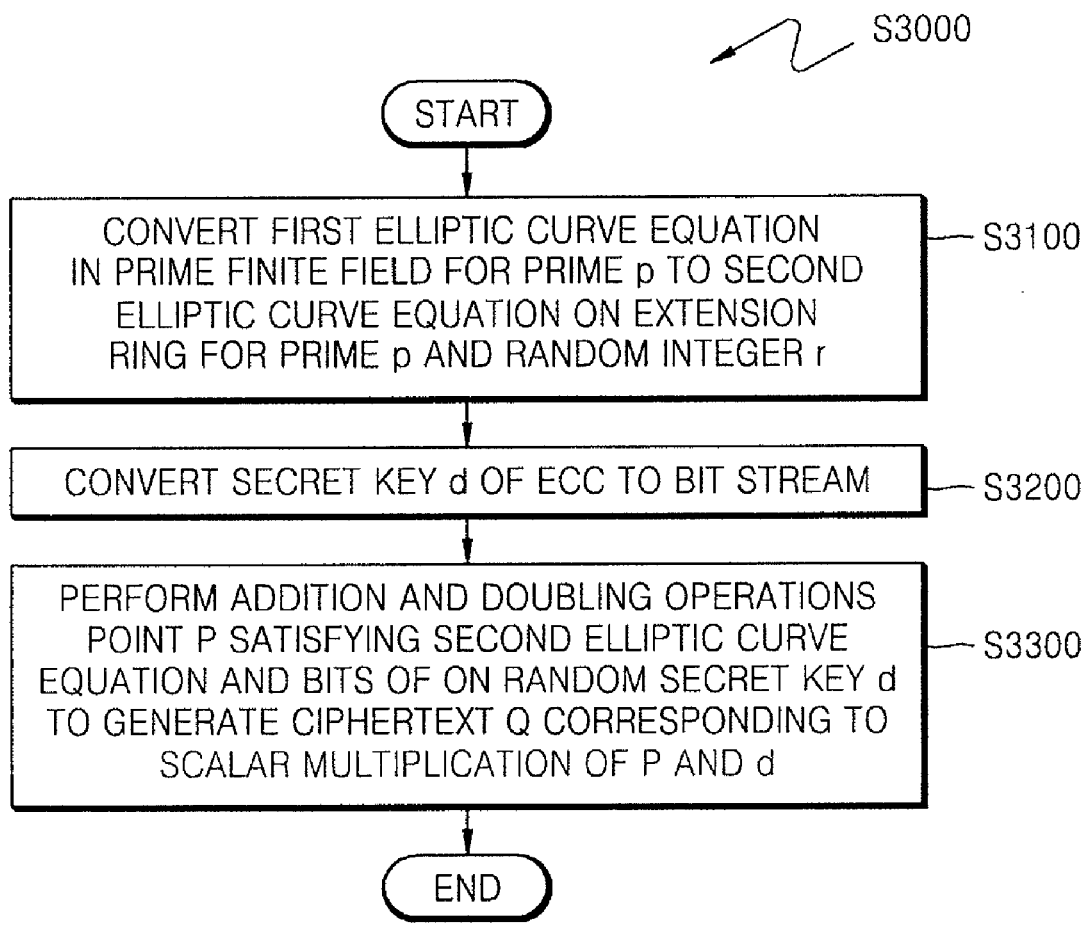
FIG. 13 is a flow chart of a method of countering simple power attacks on an ECC in a prime finite field according to an exemplary embodiment of the present invention.

FIG. 13 is a flow chart of a method 3000 of countering a simple power attack on an ECC in a prime finite field according to an embodiment of the present invention. The method of FIG. 13 corresponds to Algorithm 1.

Referring to FIG. 13, the method 3000 of countering a simple power attack on an ECC in a prime finite field according to an embodiment of the present invention includes a first step S3100 of converting the first elliptic curve equation (E:$Y^2*Z+p*YZ^3=X^3+a*X*Z^4+b*Z^6$) in the prime finite field Fp for the prime p to the second elliptic curve equation (E': $Y^2*Z+p*y*Z^3=X^3+a*X*Z^4+B*Z^6$) on the extension ring Zpr for the prime p and the integer r, a second step S3200 of converting the secret key d of the ECC to a bit stream, and a third step S3300 of performing addition and doubling operations on the point P (=(t, s)) satisfying the second elliptic curve equation and the bits of the secret key d so as to generate the ciphertext corresponding to a scalar multiplication of the point P and the secret key d.

Figure 10:
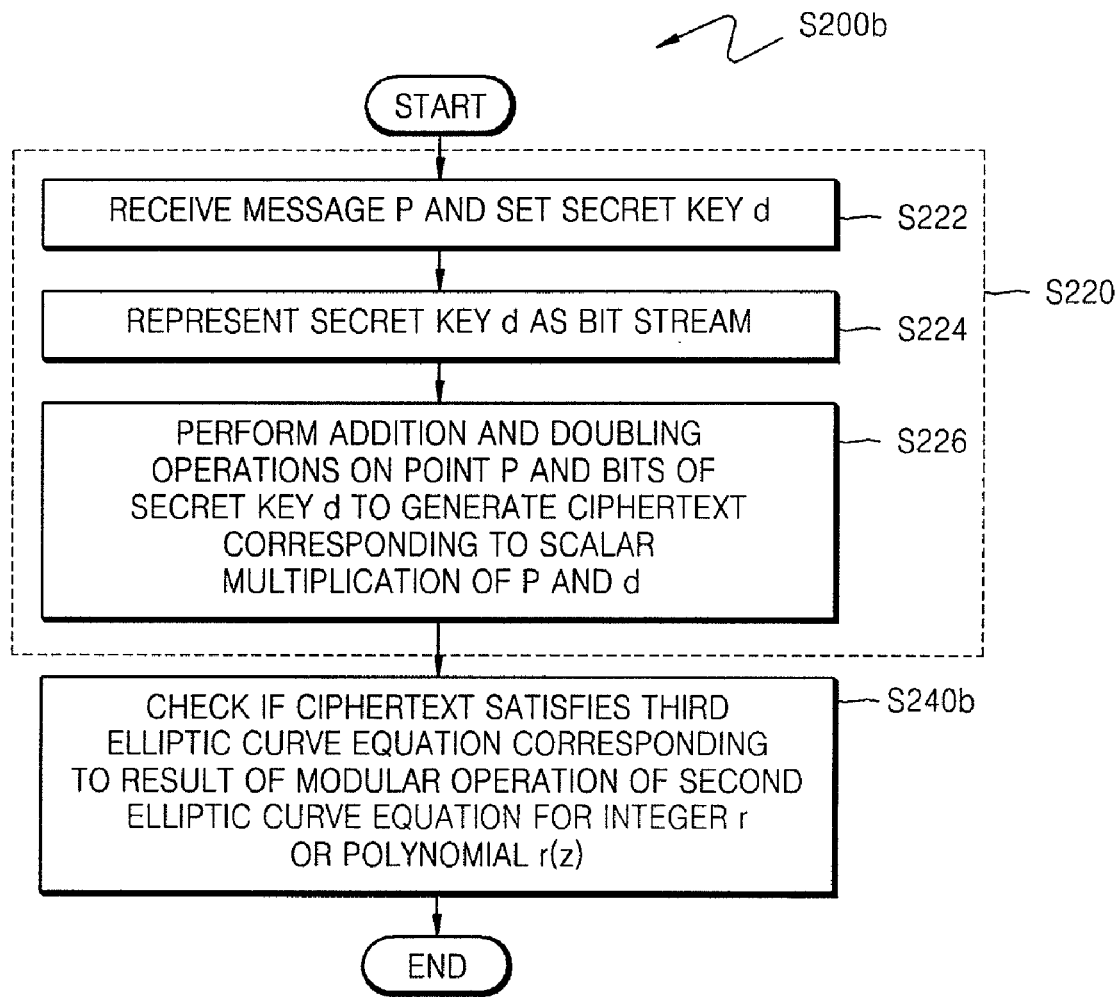
FIG. 10 is a flow chart illustrating substeps of the method of countering side-channel attacks on the ECC illustrated in FIG. 8 according to another embodiment of the present invention.

Referring back to FIGS. 8 and 9, the step S240 of checking for a fault injection attack on the ECC can determines whether the temporary ciphertext satisfies the second elliptic curve equation as in step S240a (of FIG. 9). Referring to FIG. 10 which illustrates the step S200b of countering side-channel attacks on an ECC, the fault injection attack can be detected by checking whether the temporary ciphertext satisfies a third elliptic curve equation corresponding to the result of a modular operation of the second elliptic curve equation for the integer r in substep S240b. When the second elliptic curve equation corresponds to E' of Equation 15, the third elliptic curve equation can be represented as Equation 22:

$$E':Y^2*Z+p*Y*Z^3=X^3+a*X*Z^4+B*Z^6 \bmod r \quad \text{[Equation 22]}$$

The step of checking a fault injection attack for the third elliptic curve equation represented as Equation 22 can be performed easier than the operation of checking a fault injection attack for the second elliptic curve equation represented as Equations 15 and 19. The fault injection attack has been described with reference to FIGS. 12 through 19 so that detailed explanation thereof is omitted.

Referring back to FIGS. 1 and 8, the conditional step S400 can perform modular operations on coordinates of the temporary ciphertext on the extension ring and the prime p so as to generate the final ciphertext. If a fault injection attack on an ECC is not detected in step S300, the final ciphertext is generated in conditional step S400 and thus the temporary ciphertext obtained on the extension ring is converted to the final ciphertext on the original prime finite field.

To convert the coordinates X, Y and Z of the temporary ciphertext to coordinates X', Y' and Z' of the final ciphertext, modular operations are performed on the prime p as follows.

$$X'=X \bmod p$$

$$Y'=Y \bmod p$$

$$Z'=Z \bmod p \quad \text{[Equation 23]}$$

The method of countering side-channel attacks on an ECC in a prime finite field according to the current embodiment of the present invention can be implemented as pseudocode Algorithm 2:

---

[Algorithm 2]

---

Input:
  P, a prime defining the field Fp
  E : $Y^2*Z = X^3 + a*X*Z^4 + b*Z^6$, an elliptic curve over Fp
  P = (t, s, l) ∈ E(Fp)
  d, a secret scalar
Output: Q = d*P ∈ E(Fp)
  1. Choose a small random integer r.
  2. B = $s^2 + p*s - t^3 - a*t \bmod p*r$
  3. Let E' : $Y^2*Z + p*Y*Z^3 = X^3 + a*X*Z^4 + B* Z^6$.
  4. Calculate d*P over E'/Zpr, using Algorithm 1.
  5. Check if $Y^2*Z + p*Y*Z^3 = X^3 + a*X*Z^4 + B* Z^6 \pmod r$
     for d*P=(X, Y, Z)
     If the equality does not hold, return NULL.
  6. Return (X mod p; Y mod p; Z mod p)

---

Referring to Algorithm 2, the method of countering side-channel attacks on an ECC in a prime finite field according the current embodiment of the present invention converts the elliptic curve equation to the second elliptic curve equation as represented by clause 3 of Algorithm 2. Then, the method generates the temporary ciphertext as represented by clause 4 of Algorithm 2, and performs addition and doubling operations using Algorithm 1 to counter power attacks. Subsequently, the method checks whether a fault injection attack is made on the ECC in the extension ring, as represented by clause 5 of Algorithm 2. The elliptic curve equation on the extension ring includes a first order term for Y, and thus a sign change fault attack can be also detected. Here, it is possible to reduce computational overhead by performing a modular r operation for the elliptic curve equation and then detecting whether the fault injection attack is made on the ECC. Finally, if the fault injection attack is detected (branch YES of step S300), NULL is output in conditional step S500. When the fault injection attack is not detected (branch NO of step S300), the temporary ciphertext on the extension ring is converted to the final ciphertext (Q=d*P∈E(Fp)) in the prime finite field as represented by clause 6 of Algorithm 2.

Figure 14:
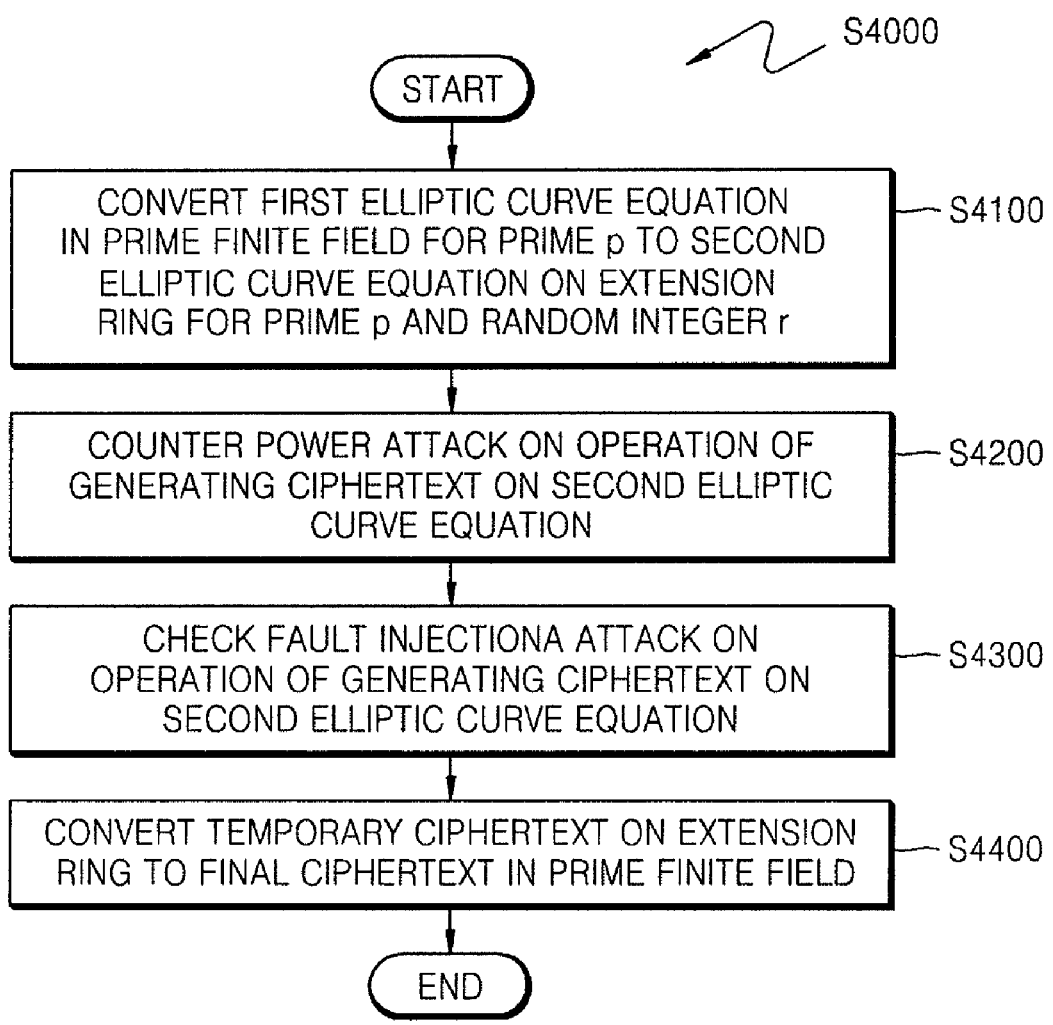
FIG. 14 is a flow chart of a method of countering differential power attacks and fault injection attacks on an ECC in a prime finite field according to an exemplary embodiment of the present invention.

FIG. 14 is a flow chart of a method of countering differential power attacks and fault injection attacks on an ECC in a prime finite field corresponding to pseudocode Algorithm 2. Referring to FIG. 14, a method 4000 of countering side-channel attacks on an ECC in a prime finite field includes a first step S4100 of converting the first elliptic curve equation (E:$Y^2*Z+p*YZ^3=X^3+a*X*Z^4+b*Z^6$) in the prime finite field Fp for the prime p to the second elliptic curve equation (E': $Y^2*Z+p*Y*Z^3=X^3+a*X*Z^4+B*Z^6$) on the extension ring Zpr for a multiplication of the prime p and the integer r, a second step S4200 of countering a differential power attack on the temporary ciphertext satisfying the second elliptic curve equation, a third step S4300 of checking whether a fault injection attack is made on the temporary ciphertext satisfying the second elliptic curve equation, and a fourth step S4400 of converting the temporary ciphertext on the extension ring to the final ciphertext in the prime finite field.

A method of countering side-channel attacks on an ECC in a binary finite field according to an embodiment of the present invention will now be explained.

Figure 5:
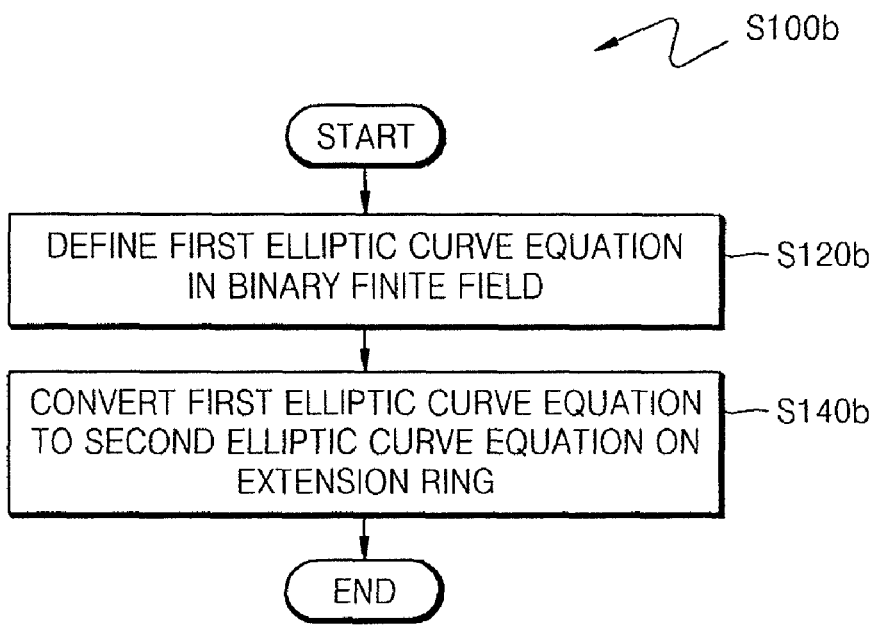
FIG. 5 is a flow chart of substeps of the step of extending the definition field of the ECC, defined in a binary finite field, illustrated in FIG. 1 according to an embodiment of the present invention.
Figure 6:
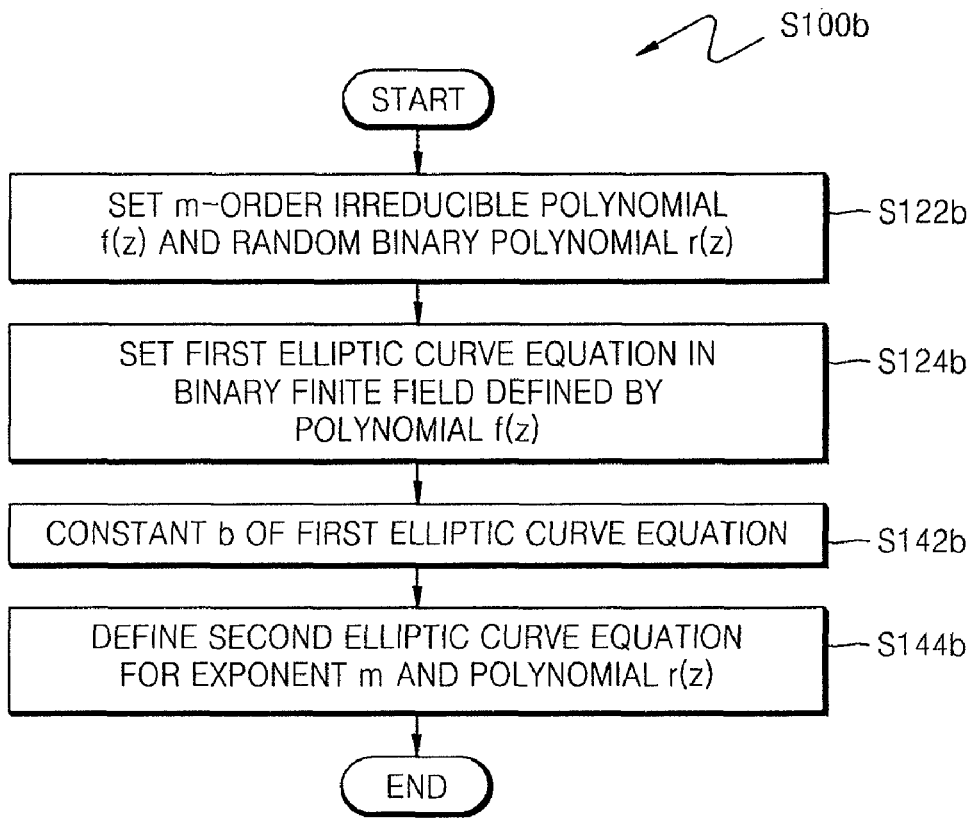
FIG. 6 is a flow chart illustrating the operation of extending the definition field of the ECC illustrated in FIG. 5 in detail.

FIG. 5 is a flow chart illustrating the substeps of step S100b (S100) of extending the definition field of the ECC of FIG. 1 in a binary finite field, and FIG. 6 is a flow chart illustrating the substeps of step S100b of FIG. 5 in more detail. Referring to FIGS. 5 and 6, the first elliptic curve equation in a binary finite field is defined in a substep S120b, and the first elliptic curve equation is converted to the second elliptic curve equation on the extension ring in substep S140b.

To define the first elliptic curve equation in the binary finite field, an m-order irreducible binary polynomial f(z) and a random polynomial r(z) are set in a substep S122b. The binary finite field for a random exponent m is represented as $F2^m$ ($=F_2[Z]/f(Z)$) and the extension ring for the irreducible binary polynomial f(z) and the polynomial r(z) is represented as $F_2[z]/f(z)*r(z)$). It is preferable that the polynomial r(z) is an irreducible binary polynomial in order to facilitate calculation of C which will be described later.

The step of converting the first elliptic curve equation to the second elliptic curve equation for the binary finite field is identical to the step of converting the first elliptic curve equation to the second elliptic curve equation for the prime finite field. However, the elliptic curve equation for the binary finite field originally includes a first order term for Y, and thus there is no need to separately check whether a sign change fault attack is made on an ECC. Accordingly, the first elliptic curve equation and the second elliptic curve equation for the binary finite field and the extension ring are respectively represented as Equations 24 (substep S124b) and 25 (substep S144b):

$$E: Y^2+X*Y*Z=X^3+a*X^2*Z^2b*Z^6 \quad \text{[Equation 24]}$$

$$E': Y^2*Z+X*Y*Z=X^3 a*X^2*Z^2+B*Z6 \quad \text{[Equation 25]}$$

Here, b in Equation 24 is converted to B in Equation 25. B is defined as follows in Equation 26 (substep S142b):

$$B=s^2+t*s+t^3+a*t^2 \bmod f(z)*r(z) \quad \text{[Equation 26]}$$

Figure 7:
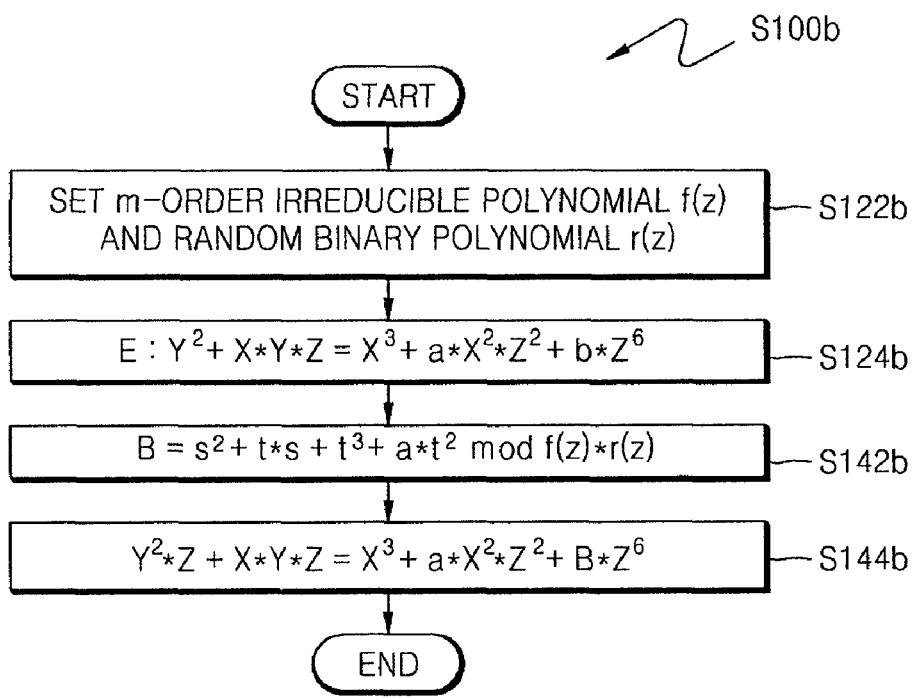
FIG. 7 is a flow chart illustrating the operation of extending the definition field of the ECC illustrated in FIG. 5 in more detail.

The aforementioned conversion operation is illustrated in detail in FIG. 7.

Referring back to FIGS. 8 and 9, the method of countering side-channel attacks on an ECC in the binary finite field counters a differential power attack on the extension ring in a step S220 and checks for a fault injection attack in a step S240. The second elliptic curve equation for the binary finite field is different from the second elliptic curve equation for the prime finite field, and thus additional addition and doubling operations are required. Equations 27 and 28 respectively define the addition and doubling operations.

$$Z3=Z1*Z2*(X1*Z2^2-X2*Z1^2)$$

$$X3=a*Z3^2+(Y1*Z2^3+Y2*Z1^3)*(Y1*Z2^3+Y2*Z1^3+Z3)+(X1*Z2^2+X2*Z1^2)^3$$

$$Y3=((Y1*Z2^3+Y2*Z1^3)*X2+Z1*Y2*(X1*Z2^2+X2*Z1^2))*((X1*Z2^2+X2*Z1^2)*Z1)^2+(Y1*Z2^3+Y2*Z1^3+Z3)*X3 \quad \text{[Equation 27]}$$

$$Z3=X1*Z1^2$$

$$X3=(X1+C*Z1^2)^4$$

$$Y3=X1^4*Z3+(Z3+X1^2+Y1*Z1)*X3 \quad \text{[Equation 28]}$$

Preconditions of Equations 27 and 28 are identical to those of Equations 20 and 21. The relationship between C in Equation 28 and B in Equations 25 and 26 is as follows:

$$C=B^{1/4} \bmod f(z)*r(z) \quad \text{[Equation 29]}$$

C is used in the doubling operation of Equation 28 for convenience of calculation, as described above. Detailed explanation of C is described in Reference [10].

The step of generating a ciphertext on the extension ring in the binary finite field may be implemented as pseudocode Algorithm 3:

[Algorithm 3]

Input:
 E : $Y^2*Z + X*Y*Z = X^3 + a*X^2*Z^2 + B*Z^6$,
  an elliptic curve over $F_2[z]/(f(z)*r(z))$
 P ∈ E($F_2[z]/(f(z)*r(z))$)
 C such that B = $C^4$ (mod (f(z)*r(z))
 d = $\Sigma^{n-1} d_i 2^i$ : secret scalar
Output: Q = d*P ∈ E($F_2[z]/(f(z)*r(z))$)
1. Q[0] ← P
2. For i = n−2 to 0 by −1, do
  2.1 Q[0] ← DLB - JP(Q[0])
  2.2 Q[1] ← ADD - JP(Q[0], P)
  2.3 Q[0] ← Q[$d_i$]
3. Return Q[0]

Algorithm 3 can be used to counter a simple power attack. The basic concept of Algorithm 3 is identical to that of Algorithm 1. However, Algorithm 3 requires C as an input value, as described above. Algorithm 3 corresponds to a flow chart of FIG. 15.

Figure 15:
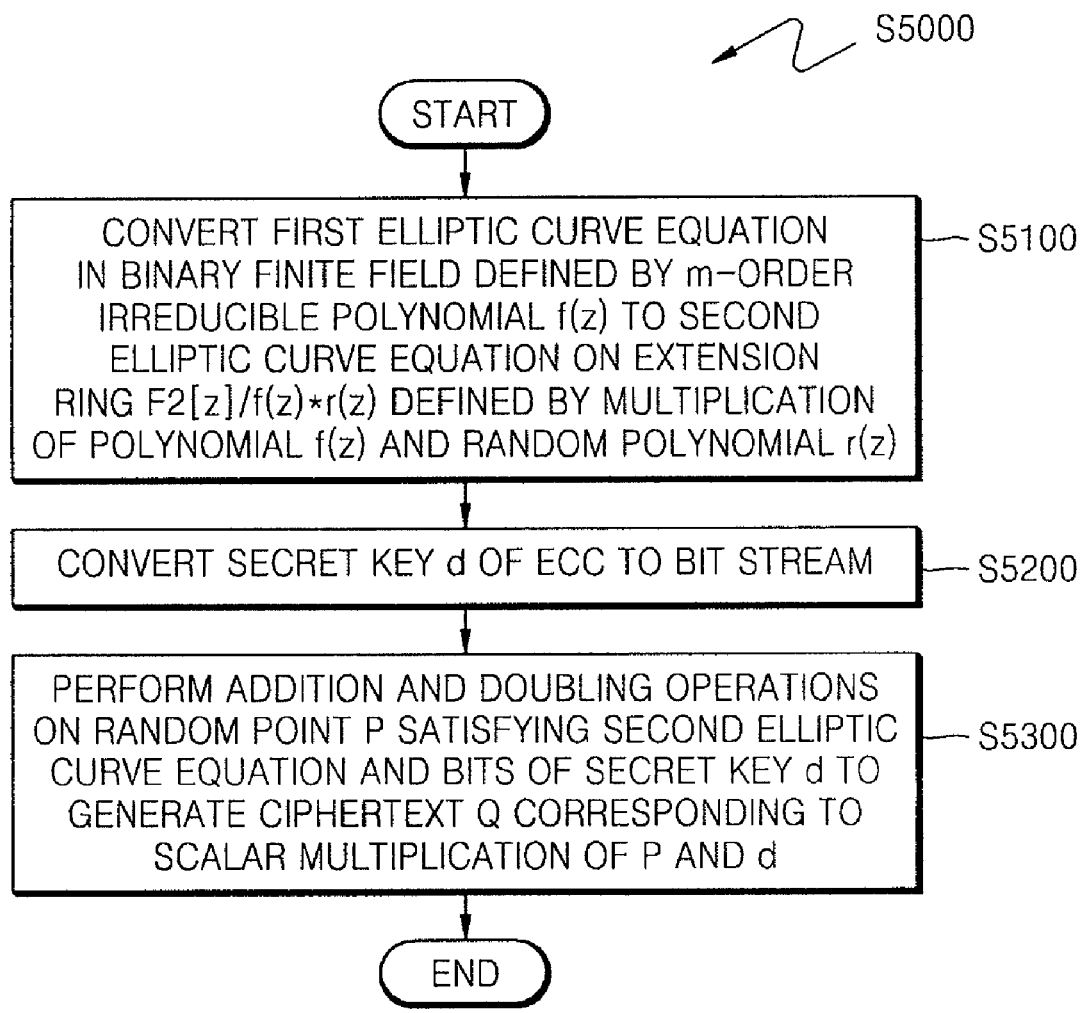
FIG. 15 is a flow chart of a method of countering simple power attacks on an ECC in a binary finite field according to an exemplary embodiment of the present invention.

Referring to FIG. 15, a method 5000 of countering a simple power attack on an ECC in a binary finite field according to an exemplary embodiment of the present invention includes a first step S5100 of converting the first elliptic curve equation (E:$Y^2+X*Y*Z=X^3+a*X^2*Z^2+b*Z^6$) in the binary finite field $F2^m$(=$F_2[Z]/f(Z)$) for the polynomial f(z) to the second elliptic curve equation (E':$Y^2*Z+X*Y*Z=X^3+a*X^2*Z^2+B*Z^6$) on the extension ring $F_2[z]/f(z)*r(z)$) for the polynomial r(z), a second step S5200 of converting the secret key d of the ECC to a bit stream, and a third step S5300 of performing addition and doubling operations on the point P satisfying the second elliptic curve equation and the bits of the secret key d to generate a ciphertext corresponding to a scalar multiplication of the point P and the secret key d. The operation of steps similar to steps S5100, S5200 and S5300 have been previously described so that detailed explanations thereof are omitted.

Referring back to FIG. 9, the step of checking a fault injection attack on ECC in the binary finite field is similar to the step of checking a fault injection attack on an ECC in the prime finite field. However, though it is determined whether the temporary ciphertext satisfies the third elliptic curve equation corresponding to the result of a modular operation performed on the integer r and the second elliptic curve equation in the step of checking a fault injection attack on the ECC in the prime finite field, the third elliptic curve equation is defined according to a modular operation performed on the polynomial r(z) in the step of checking a fault injection attack on an ECC in the binary finite field in operation S240b, as illustrated in FIG. 10. The third elliptic curve equation can be represented in Equation 30 as follows:

$$E': Y^2*Z + X*Y*Z^3 = X^3 + a*X^2*Z^4 + B*Z^6 \bmod r(z) \qquad \text{[Equation 30]}$$

Referring back to FIGS. 1 and 8, the method of countering side-channel attacks on an ECC in a binary finite field counters a power attack and a fault injection attack in the extension ring for the binary finite field, generates a temporary ciphertext on the extension ring, and then converts the temporary ciphertext to a final ciphertext in the binary finite field in step S400. Here, modular operations are performed on f(z) and coordinates of the temporary ciphertext to generate the final ciphertext.

The method of countering side-channel attacks on an ECC in a binary finite field can be implemented as pseudocode Algorithm 4:

---

[Algorithm 4]

Input:
  f(z), an irreducible polynomial defining a field $F2^m (=F_2[z]/f(z))$
  $E: Y^2 + X*Y*Z = X^3 + a*X^2*Z^2 + b*Z^6$
  $P = (t, s, l) \in E(F2^m)$
  d, the secret exponent
Output: $Q = d*P \in E(F2^m)$
  1. Choose a random irreducible polynomial r(z) of small degree.
  2. $B = s^2 + t*s + t^3 + a*t^2 \bmod f(z)*r(z)$
  3. Let $E': Y^2*Z + X*Y*Z = X^3 + a*X^2*Z^2 + B*Z^6$.
  4. Calculate $C \in E'(F_2[z]/f[z]*r(z))$ such that $B = C^4 \bmod f(z)*r(z)$.
  5. Calculate $d*P=(X, Y, Z)$ for $P=(t, s, l)$ over $E'(F_2[z]/f[z]*r(z))$ using Algorithm 3.
  6. Check if $Y^2*Z + X*Y*Z = X^3 + a*X^2*Z^2 + B*Z^6 \pmod{r(z)}$ for $d*P=(X, Y, Z)$.
     If the equality does not hold, return NULL.
  7. Return $(X \bmod f(z); Y \bmod f(z); Z \bmod f(z))$

---

Figure 16:
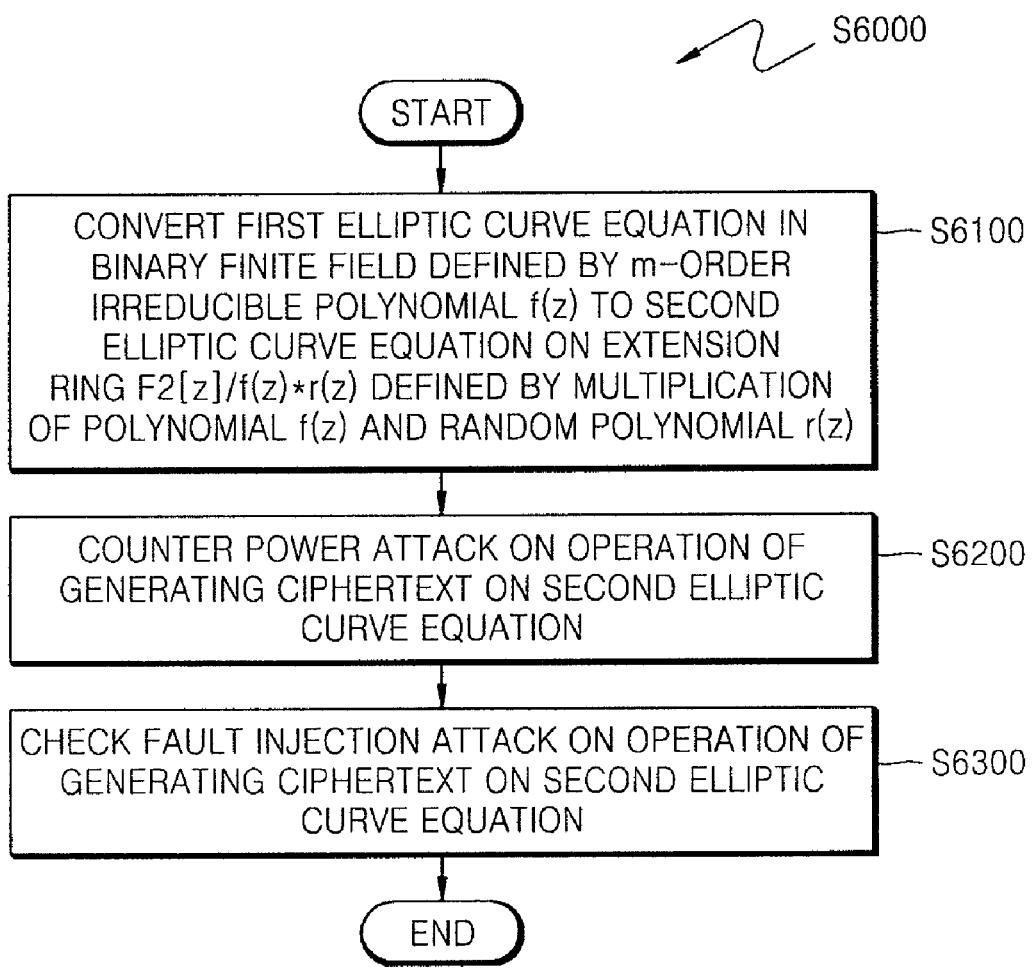
FIG. 16 is a flow chart of a method of countering differential power attacks and fault injection attacks on an ECC in a binary finite field according to an exemplary embodiment of the present invention.

Algorithm 4 can be understood with comparison to Algorithm 2. The method of FIG. 16 corresponds to Algorithm 4. Referring to FIG. 16, a method 6000 of countering side-channel attacks on an ECC in a binary finite field according to an exemplary embodiment of the present invention includes a first step S6100 of converting the first elliptic curve equation $(E:Y^2+X*Y*Z=X^3+a*X^2*Z^2+b*Z^6)$ in the binary finite field $F2^m(=F_2[Z]/f(z))$ for the polynomial f(z) to the second elliptic curve equation $(E':Y^2*Z+X*Y*Z=X^3+a*X^2*Z^2+B*Z^6)$ on the extension ring $F_2[z]/f(z)*r(z))$ for the polynomial r(z), a second step S6200 of protecting a temporary ciphertext satisfying the second elliptic curve equation from a differential power attack, a third step S6300 of checking if a fault injection attack is made on the temporary ciphertext satisfying the second elliptic curve equation, and a fourth step S6400 of converting the temporary ciphertext on the extension ring to the final ciphertext in the binary finite field. The steps S6100, S6200, S6300 and S6400 are similar to steps that have been described above so that detailed explanations thereof are omitted.

As described above, the exemplary embodiments of the present invention extend a definition field of an elliptic curve to a random extension ring to reinforce the stability of an ECC, counters a power attack and checks for a fault injection attack on the ECC in the extension ring and determines the validity of a point for the fault attack in a subring of the extension ring so as to minimize computational overhead.

The above-described method of countering side-channel attacks on an ECC according to embodiments of the present invention can improve the stability of the ECC and reduce computational overhead of the ECC.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of countering side-channel attacks on an elliptic curve cryptosystem (ECC), the method comprising:
   providing a system for message communication between a pair of correspondents, a message being exchanged in accordance with ECC instructions executable on computer processors of the respective correspondents, the ECC instructions including:
   extending a definition field of an elliptic curve of the ECC to an extension ring in a first field by defining a first elliptic curve equation and converting the first elliptic curve equation to a second elliptic curve equation, wherein the second elliptic curve equation includes a term for checking if there is a sign change fault attack on the ECC;
   generating a temporary ciphertext in the extension ring and countering attacks on the ECC; and
   generating a final ciphertext for the first field,
   wherein the first elliptic curve equation becomes $Y^2*Z + p*YZ^3 = X^3 + a*X^2*Z^4 + b*Z^6$ when represented in Jacobian coordinate and becomes $y^2 + p*y = x^3 + a*x + b$ when represented in Affine coordinate, and wherein the converting of the first elliptic curve equation to the second elliptic curve equation comprises converting b to B $(=s^2 + p*s - t^3 - a*t \bmod p*r)$ so as to obtain the second elliptic curve equation, $Y^2*Z + p*Y*Z^3 = X^3\ a*X*Z^4 + B*Z^6$, when the coordinates of the input point P of the ECC is (t, s),
   wherein: X is a Jacobian variable X coordinate; each a and b is one of a finite field Fq having elements q (q is a prime), x and y are Affine variable x and y coordinates, B is a converted value of b from the first elliptic curve equation to the second elliptic curve equation, s and t are the coordinates of the input point P of the ECC.

2. The method of claim 1, wherein generating the final ciphertext is only performed if the temporary ciphertext satisfies a second elliptic curve equation in the extension ring.

3. The method of claim 2, wherein the first field is a prime finite field and wherein the extending of the definition field of the elliptic curve to the extension ring comprises:
   setting a prime p and a random integer r;
   defining a first elliptic curve equation in the prime finite field for the prime p; and converting the first elliptic curve equation to the second elliptic curve equation in the extension ring for the prime p and the integer r.

4. The method of claim 3, wherein the countering of attacks on the ECC comprises checking if the temporary ciphertext satisfies a third elliptic curve equation corresponding to the result of a modular operation of the second elliptic curve equation for the integer r.

5. The method of claim 3, wherein coordinates of the sum P3 (=(X3; Y3; Z3)) of two points P1 (=(X1; Y1; Z1)) and P2 (=(X2; Y2; Z2)) satisfying the second elliptic curve equation are obtained according to the following addition operations if P1≠±P2 and P1 and P2 are not points at infinity:

$$Z3=Z1*Z2*(X2*Z1^2-X1*Z2^2)$$

$$X3=(Y2*Z1^3-Y1*Z2^3)^2-(X2*Z1^2X1*Z2^2)^2*(X2*Z1^2+X1*Z2^2)$$

$$Y3=(Y2*Z1^3-Y1*Z2^3)*(X1*Z2^{2*}(X2*Z1^2-X1*Z2^2)^2-X3)-(Y1+p*Z1^3)*(Z2^{3*}(X2*Z1^2-X1*Z2^2)^3)$$

wherein: X1 is a Jacobian variable X coordinate of a point P1; Y1 is a Jacobian variable Y coordinate of the point P1; Z1 a Jacobian variable Z coordinate of the point P1; X2 is a Jacobian variable X coordinate of a point P2; Y2 is a Jacobian variable Y coordinate of the point P2; Z2 a Jacobian variable Z coordinate of the point P2.

6. The method of claim 3, wherein coordinates of the sum P3 (=P1+P2=2*P1=2*P2=(X3; Y3; Z3)) of two points P1 (=(X1; Y1; Z1)) and P2 (=(X2; Y2; Z2) satisfying the second elliptic curve equation are obtained according to the following doubling operations if P1=P2 and P1 and P2 are not points at infinity:

$$Z3=Z1*(2*Y1+p*Z1^3)$$

$$X3=(3*X1^2+a*Z1^4)^2-2*X1*(2*Y1+p*Z1^3)^2$$

$$Y3=(3*X1^2+a*Z1^4)*(X1*(2*Y1+p*Z1^3)^2-X3)-(Y1+p*Z1^3)*(2*Y1+p*Z1^3)^3$$

wherein: X1 is a Jacobian variable X coordinate of a point P1; Y1 is a Jacobian variable Y coordinate of the point P1; Z1 a Jacobian variable Z coordinate of the point P1; X2 is a Jacobian variable X coordinate of a point P2; Y2 is a Jacobian variable Y coordinate of the point P2; Z2 a Jacobian variable Z coordinate of the point P2.

7. The method of claim 2, wherein the generating of the final ciphertext for the first field comprises generating the first ciphertext corresponding to the result of a modular operation on coordinates of the temporary ciphertext on the extension ring for the prime p.

8. A method of countering side-channel attacks on an elliptic curve cryptosystem (ECC), the method comprising:
providing a system for message communication between a pair of correspondents, a message being exchanged in accordance with ECC instructions executable on computer processors of the respective correspondents, the ECC instructions including:
extending a definition field of an elliptic curve of the ECC to an extension ring in a first field by defining a first elliptic curve equation and converting the first elliptic curve equation to a second elliptic curve equation, wherein the second elliptic curve equation includes a term for checking if there is a sign change fault attack on the ECC;
generating a temporary ciphertext in the extension ring and countering attacks on the ECC; and
generating a final ciphertext for the first field,
wherein the first field is a binary finite field,
wherein the extending the definition field of the elliptic curve to the extension ring comprises:
setting an m-order irreducible binary polynomial f(z) and a random polynomial r(z);
defining a first elliptic curve equation in the binary finite field $F2^m(=F_2[z]/f(z))$ for the irreducible binary polynomial f(z); and
converting the first elliptic curve equation to a second elliptic curve equation on an extension ring $F_2[z]/(f(z)*r(z))$ for the irreducible binary polynomial f(z) and the polynomial r(z),
wherein: z is a variable of the m-order irreducible binary polynomial f(z) and $F_2$ represents the binary finite field for the z,
wherein the first elliptic curve equation corresponds to $Y^2+X*Y*Z=X^3a*X^2*Z^2+b*Z^6$ and the second elliptic curve equation corresponds to $Y^2*Z+X*Y*Z=X^3a*X^2*Z^2+B*Z^6$ wherein b is converted to B $(=s^2+t*s+t^3+a*t^2 \bmod f(z)*r(z))$, if the coordinates of an input point P of the ECC is (t, s),
wherein: X is a Jacobian variable X coordinate; each a and b is one of a finite field Fq having elements q (q is a prime), x and y are Affine variable x and y coordinates, z is a variable of the m-order irreducible binary polynomial f(z); B is a converted value of b from the first elliptic curve equation to the second elliptic curve equation, s and t are the coordinates of the input point P of the ECC.

9. The method of claim 8, wherein the polynomial r(z) is an irreducible binary polynomial,
wherein: z is a variable of the m-order irreducible binary polynomial f(z).

10. The method of claim 8, wherein the countering of attacks on the ECC comprises checking if the temporary ciphertext satisfies a third elliptic curve equation corresponding to the result of a modular operation of the second elliptic curve equation for the polynomial r(z).

11. The method of claim 8, wherein coordinates of the sum P3 (=(X3; Y3; Z3)) of two points P1 (=(X1; Y1; Z1)) and P2 (=(X2; Y2; Z2)) satisfying the second elliptic curve equation are obtained according to the following addition operations if P1≠±P2 and P1 and P2 are not points at infinity:

$$Z3=Z1*Z2*(X1*Z2^2-X2*Z1^2)$$

$$X3=a*Z3^2+(Y1*Z2^3+Y2*Z1^3)*(Y1*Z2^3+Y2*Z1^3+Z3)+(X1*Z2^2+X2*Z1^2)^3$$

$$Y3=((Y1*Z2^3+Y2*Z1^3)*X2+Z1*Y2*(X1*Z2^2+X2*Z1^2))*((X1*Z2^2+X2*Z1^2)*Z1)^2+(Y1*Z2^3+Y2*Z1^3+Z3)*X3$$

wherein: X1 is a Jacobian variable X coordinate of a point P1; Y1 is a Jacobian variable Y coordinate of the point P1; Z1 a Jacobian variable Z coordinate of the point P1; X2 is a Jacobian variable X coordinate of a point P2; Y2 is a Jacobian variable Y coordinate of the point P2; Z2 is a Jacobian variable Z coordinate of the point P2.

12. The method of claim 8, wherein coordinates of the sum P3 (=P1+P2=2*P1=2*P2=(X3; Y3; Z3)) of two points P1 (=(X1; Y1; Z1)) and P2 (=X2; Y2; Z2) satisfying the second elliptic curve equation are obtained according to the following doubling operations if P1=P2 and P1 and P2 are not points at infinity:

$$Z3=X1*Z1^2$$

$$X3=(X1+C*Z1^2)^4$$

$$Y3=X1^4*Z3+(Z3+X1^2+Y1*Z1)*X3$$

wherein $C=B^{1/4}$ mod $f(z)*r(z)$ wherein: X1 is a Jacobian variable X coordinate of a point P1; Y1 is a Jacobian variable Y coordinate of the point P1; Z1 a Jacobian variable Z coordinate of the point P1; X2 is a Jacobian variable X coordinate of a point P2; Y2 is a Jacobian variable Y coordinate of the point P2; Z2 is a Jacobian variable Z coordinate of the point P2, B is a converted value of b from the first elliptic curve equation to the second elliptic curve equation and C is a remainder of division of $B^{1/4}$ mod $f(z)*r(z)$.

13. The method of claim 8, wherein the generating of the final ciphertext for the first field comprises performing a modular operation on coordinates of the temporary ciphertext on the extension ring for the polynomial $f(z)$,
   wherein: z is a variable of the m-order irreducible binary polynomial $f(z)$.

14. An elliptic curve cryptosystem (ECC) apparatus comprising:
   a computer processor for message communication between a pair of correspondents, a message being exchanged in accordance with ECC instructions executable by a computer processor of the respective correspondents; and
   a program storage device configured to store instructions for countering side-channel attacks on the elliptic curve cryptosystem (ECC), the instructions for countering side-channel attacks on the ECC comprising:
      extending a definition field of an elliptic curve of the ECC to an extension ring in a first field by defining a first elliptic curve equation and converting the first elliptic curve equation to a second elliptic curve equation, wherein the second elliptic curve equation includes a term for checking if there is a sign change fault attack on the ECC;
      generating a temporary ciphertext in the extension ring and countering attacks on the ECC; and
   generating a final ciphertext for the first field only if the temporary ciphertext satisfies a second elliptic curve equation in the extension ring,
   wherein the first elliptic curve equation becomes $Y^2*Z+p*YZ^3=X^3+a*X*Z^4+b*Z^6$ when represented in Jacobian coordinate and becomes $y^2+p*y=x^3+a*x+b$ when represented in Affine coordinate, and wherein the converting of the first elliptic curve equation to the second elliptic curve equation comprises converting b to B ($=s^2+p*s-t^3-a*t$ mod $p*r$) so as to obtain the second elliptic curve equation, $Y^2*Z+p*Y*Z^3=X^3+a*X*Z^4+B*Z^6$, when the coordinates of the input point P of the ECC is (t, s),
   wherein: X is a Jacobian variable X coordinate; each a and b is one of a finite field Fq having elements q (q is a prime), x and y are Affine variable x and y coordinates, B is a converted value of b from the first elliptic curve equation to the second elliptic curve equation, s and t are the coordinates of the input point P of the ECC.

* * * * *